United States Patent
Ray et al.

(10) Patent No.: US 7,119,280 B1
(45) Date of Patent: Oct. 10, 2006

(54) SYSTEM AND METHOD FOR CABLE MANAGEMENT ON RACK MOUNTED INSTALLATIONS

(75) Inventors: Brian J. Ray, Livermore, CA (US); Adolpho Gonzalez, Fresno, CA (US); William R. Jones, III, San Francisco, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 177 days.

(21) Appl. No.: 10/722,172

(22) Filed: Nov. 24, 2003

(51) Int. Cl.
 *H02G 3/04* (2006.01)
(52) U.S. Cl. ............... 174/72 A; 174/97; 174/135; 174/503; 361/826; 439/719
(58) Field of Classification Search .............. 174/48, 174/50, 72 A, 72 C, 72 R, 97, 100, 135, 174/481, 503; 211/26; 361/826–828; 439/719; D8/356; D13/155
See application file for complete search history.

(56) References Cited

U.S. PATENT DOCUMENTS

| 1,365,613 | A | | 1/1921 | Hiss |
|---|---|---|---|---|
| 2,363,327 | A | | 11/1944 | Hodgkins et al. |
| 3,668,744 | A | | 6/1972 | Moody et al. |
| 4,688,961 | A | | 8/1987 | Shioda et al. |
| D339,982 | S | | 10/1993 | Rodriguez Prados |
| 5,655,738 | A | | 8/1997 | Ragsdale et al. |
| D387,652 | S | | 12/1997 | Carlson, Jr. |
| 5,731,546 | A | | 3/1998 | Miles et al. |
| 5,806,811 | A | | 9/1998 | Viklund et al. |
| 5,939,680 | A | * | 8/1999 | Gretz et al. ............... 174/135 |
| D428,330 | S | | 7/2000 | Johnston et al. |
| 6,118,075 | A | | 9/2000 | Baker et al. |
| 6,127,631 | A | | 10/2000 | Green et al. |
| 6,170,784 | B1 | | 1/2001 | MacDonald et al. |
| D439,503 | S | | 3/2001 | Paliga et al. |
| D439,828 | S | | 4/2001 | Kiely et al. |
| 6,215,064 | B1 | | 4/2001 | Noble et al. |
| 6,215,069 | B1 | | 4/2001 | Martin et al. |
| 6,310,294 | B1 | | 10/2001 | Di Girolamo et al. |
| 6,362,422 | B1 | | 3/2002 | Vavrik et al. |
| 6,363,198 | B1 | | 3/2002 | Braga et al. |
| D456,241 | S | | 4/2002 | Chan et al. |
| 6,378,811 | B1 | | 4/2002 | Potter et al. |
| 6,381,393 | B1 | | 4/2002 | Matthews et al. |
| 6,396,992 | B1 | | 5/2002 | Debal |
| D463,253 | S | | 9/2002 | Canty |
| 6,467,633 | B1 | | 10/2002 | Mendoza |
| 6,468,112 | B1 | | 10/2002 | Follingstad et al. |
| 6,489,565 | B1 | | 12/2002 | Krietzman et al. |
| 6,501,899 | B1 | | 12/2002 | Marrs et al. |
| D468,699 | S | | 1/2003 | Bjorklund et al. |
| 6,504,094 | B1 | | 1/2003 | Woo et al. |

(Continued)

FOREIGN PATENT DOCUMENTS

DE 3921224 1/1991

(Continued)

OTHER PUBLICATIONS

UK Search Report dated Feb. 14, 2005.

(Continued)

*Primary Examiner*—William H. Mayo, III
*Assistant Examiner*—Adolfo Nino
(74) *Attorney, Agent, or Firm*—Blakely, Sokoloff, Taylor & Zafman LLP

(57) ABSTRACT

A cable harness, cable clip, and bundle clip, which may be used individually or in combination, to perform cable management for a rack mounted installation.

16 Claims, 22 Drawing Sheets

U.S. PATENT DOCUMENTS

| | | |
|---|---|---|
| 6,525,273 B1 | 2/2003 | Cunningham |
| 6,539,161 B1 | 3/2003 | Holman et al. |
| 6,540,312 B1 | 4/2003 | Lane |
| 6,541,705 B1 | 4/2003 | McGrath |
| 6,543,626 B1 | 4/2003 | Mendoza |
| 6,546,181 B1 | 4/2003 | Adapathya et al. |
| 6,553,172 B1 | 4/2003 | Lortie et al. |
| 6,584,267 B1 | 6/2003 | Caveney et al. |
| 6,586,680 B1 * | 7/2003 | Nelson .................. 174/135 |
| 6,590,785 B1 | 7/2003 | Lima et al. |
| D479,707 S | 9/2003 | Caswell |
| 6,614,978 B1 | 9/2003 | Caveney |
| 6,678,456 B1 | 1/2004 | Etemad-Moghadam |
| 6,686,541 B1 * | 2/2004 | Chan .................. 174/72 A |
| D493,355 S | 7/2004 | Dinh |
| 6,766,093 B1 * | 7/2004 | McGrath et al. ........... 385/134 |
| 6,937,461 B1 * | 8/2005 | Donahue, IV ............ 361/829 |
| 2001/0031124 A1 | 10/2001 | McGrath et al. |
| 2003/0037953 A1 | 2/2003 | Sarkinen et al. |
| 2003/0051892 A1 | 3/2003 | Mattei et al. |
| 2003/0108321 A1 | 6/2003 | Krampotich et al. |
| 2003/0108322 A1 | 6/2003 | Douglas et al. |
| 2004/0026105 A1 | 2/2004 | Mendoza |

FOREIGN PATENT DOCUMENTS

| | | |
|---|---|---|
| EP | 179750 | 4/1986 |
| EP | 1160604 | 6/2004 |

OTHER PUBLICATIONS

"Racks and Cable Management Products", www. heller.tyton.com.

"Cable Management Rack Systems", Panduit Network Connectivity Group, www.panduit.com.

"CMR-84 Cable Management Relay Rack", Great Lakes Case & Cabinet Co., Inc., www.werackyourworld.com.

"Signature Solutions . . . Cable Management", Chatsworth Products, Inc., www.chatsworth.com/cablemanagement.

* cited by examiner

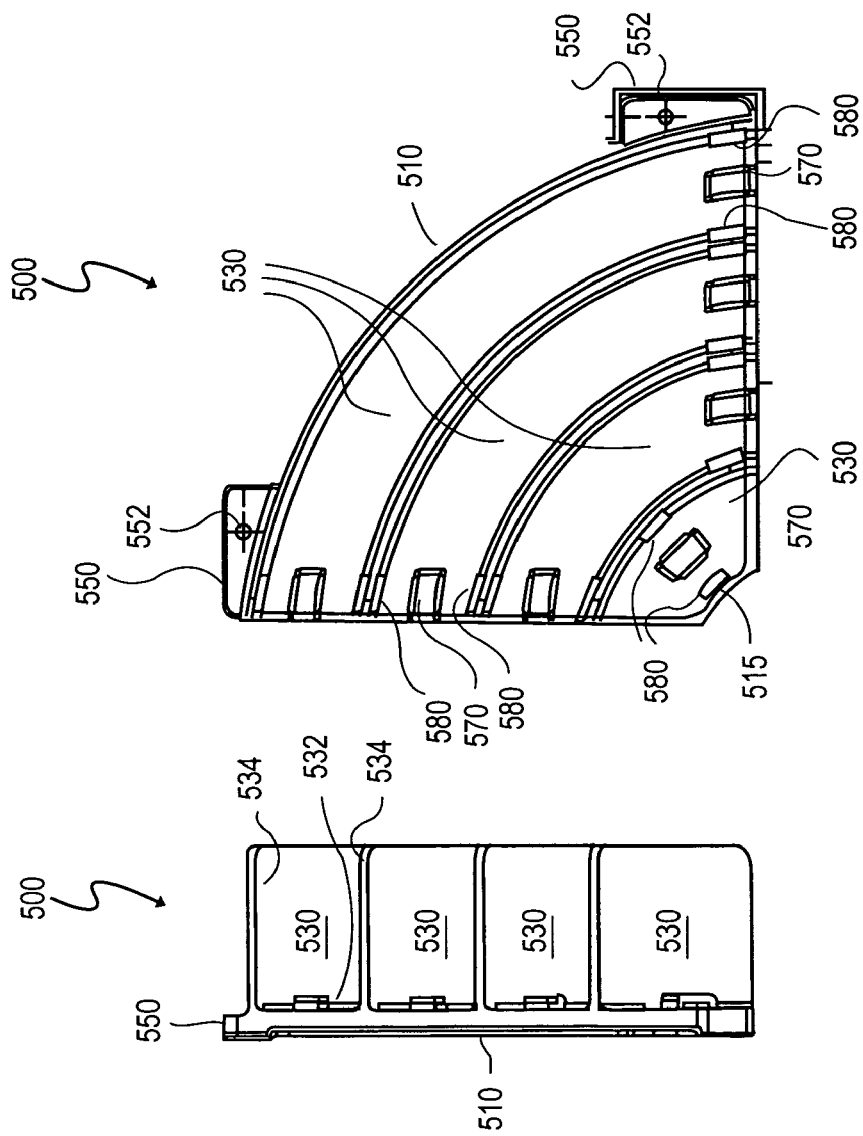

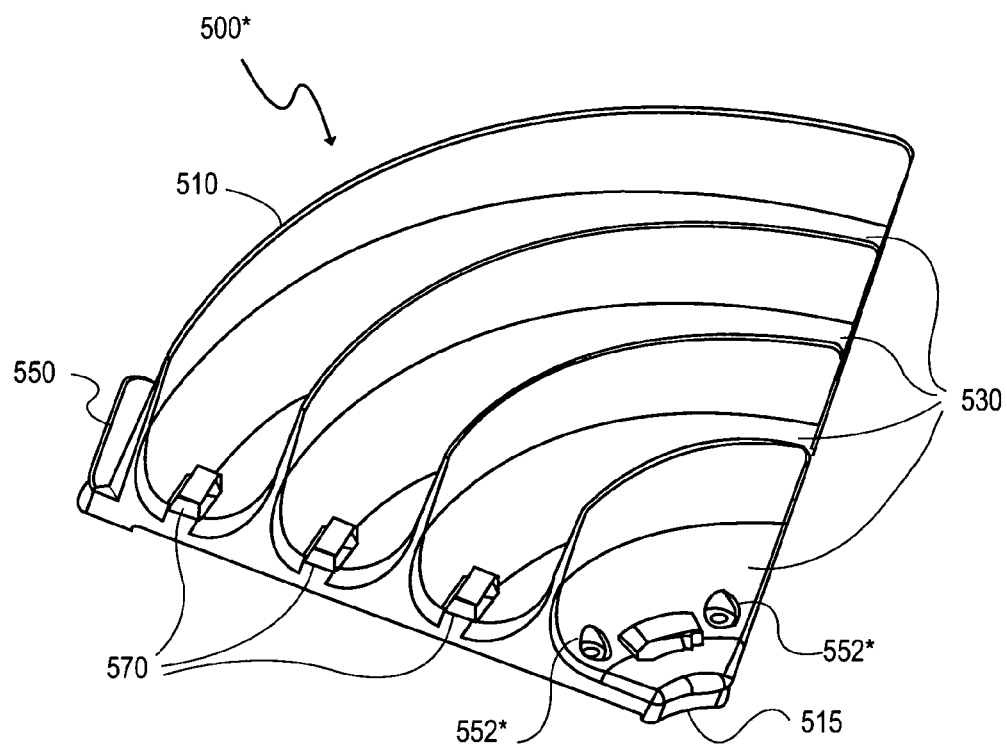
FIG. 5F
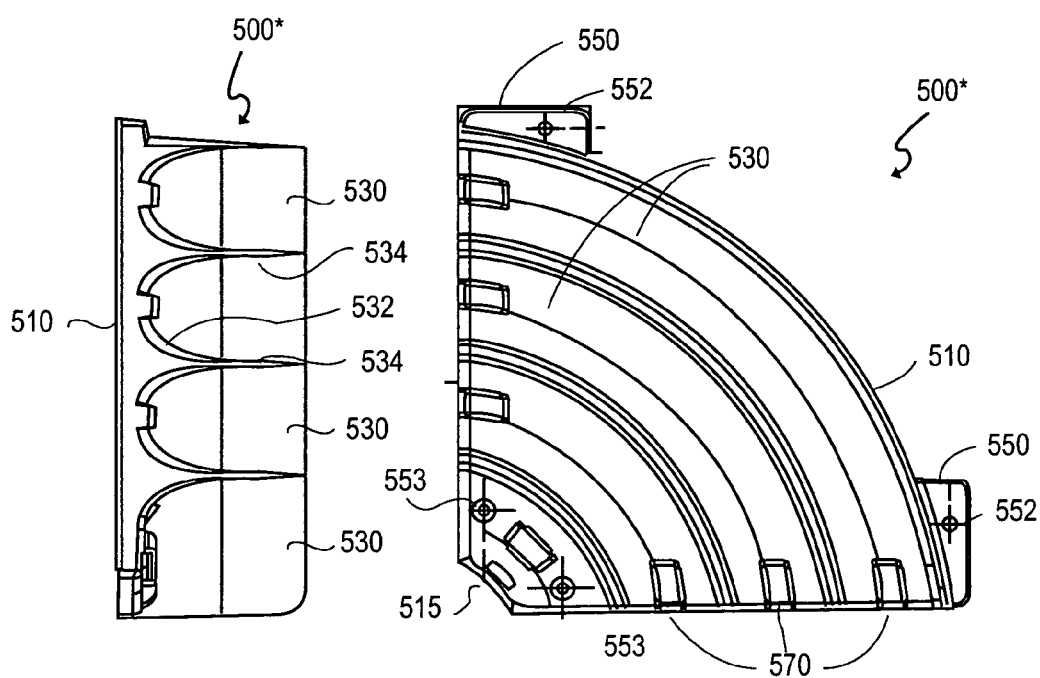
FIG. 5H  FIG. 5G

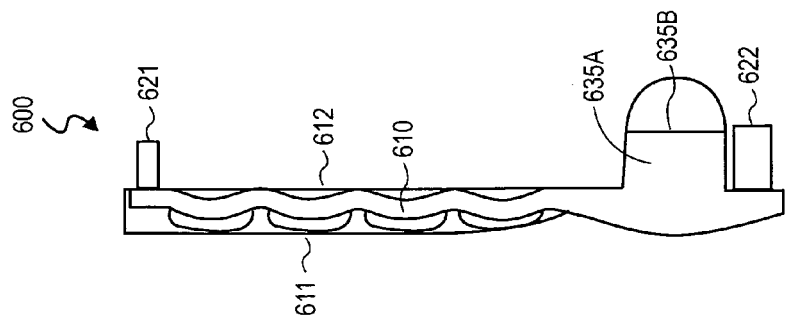
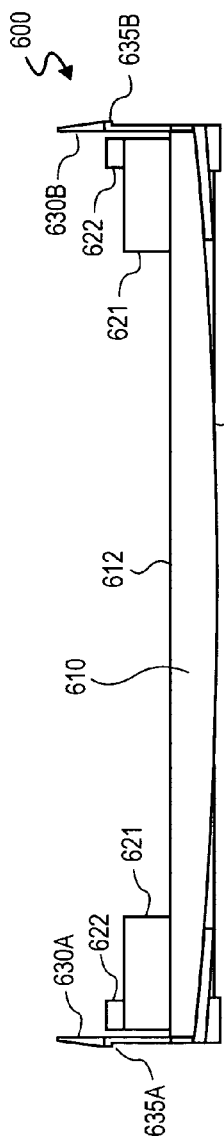
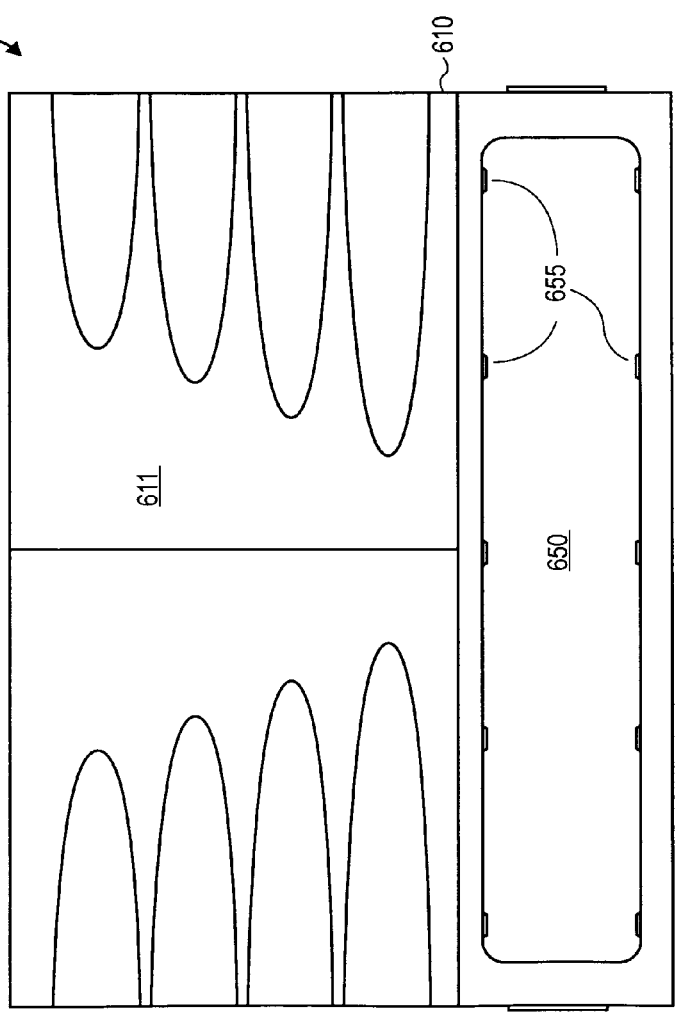
FIG. 6D
FIG. 6E
FIG. 6C

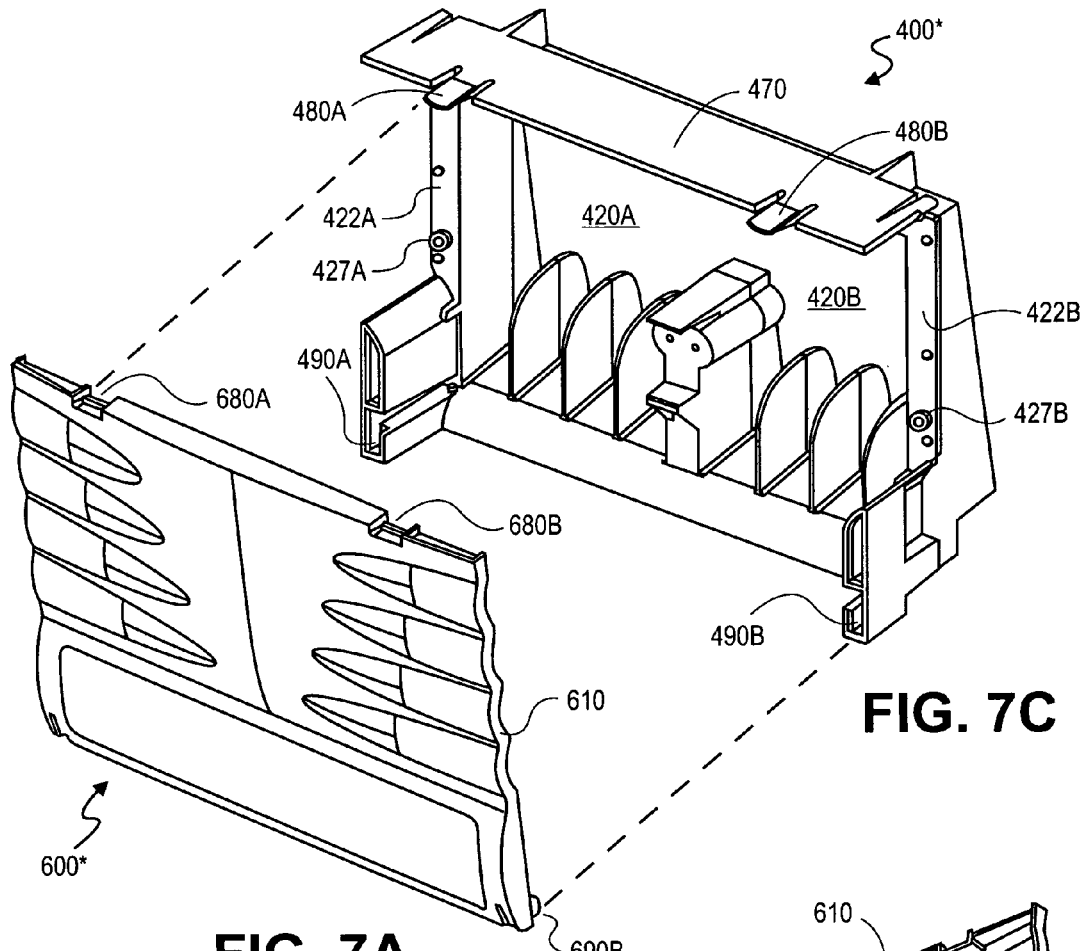
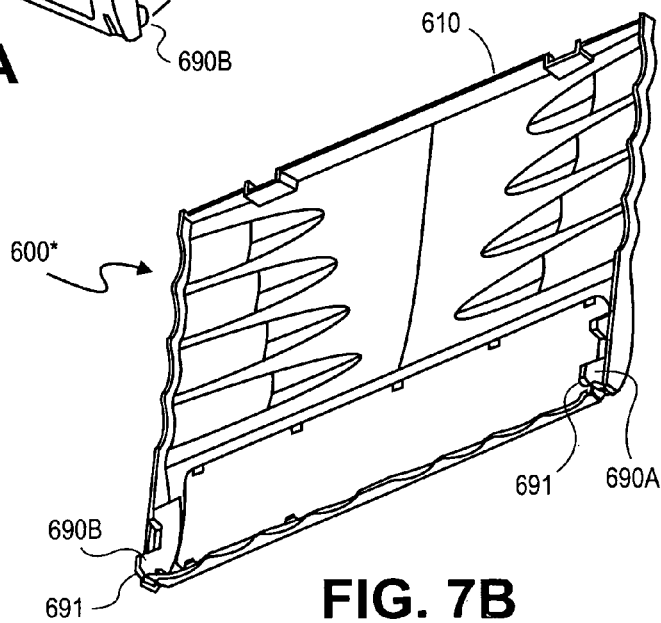

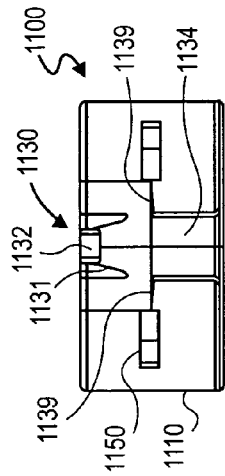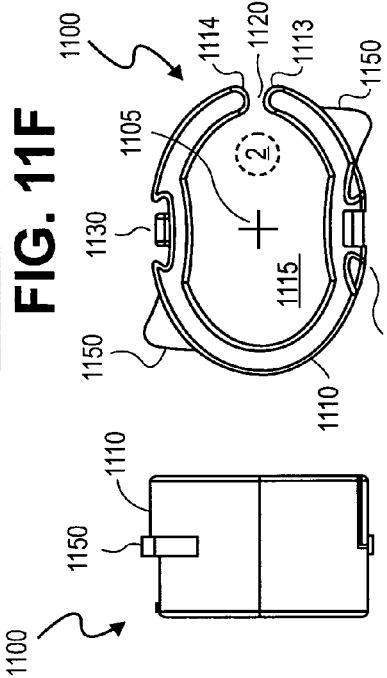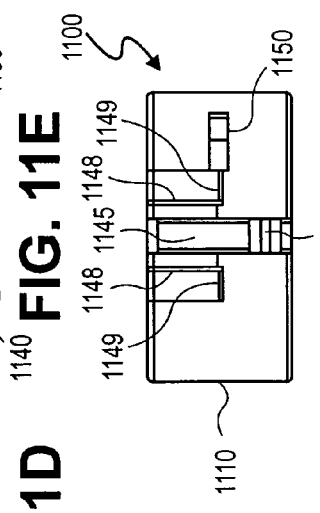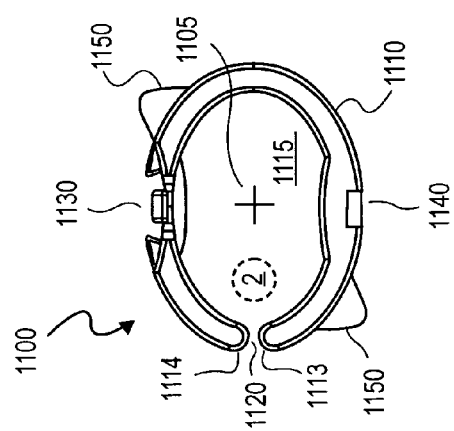

SYSTEM AND METHOD FOR CABLE MANAGEMENT ON RACK MOUNTED INSTALLATIONS

FIELD OF THE INVENTION

The invention relates generally to rack mounted computing devices and, more particularly, to a cable management system and method for rack mounted installations.

BACKGROUND OF THE INVENTION

For some computing applications, such as computer networking and telecommunications, it is often necessary to store a large number of computing devices (e.g., switches, routers, servers, etc.) in a relatively small area. To facilitate such a high component density, a number of the computing devices are typically mounted together in a "rack." A rack may also be referred to as a "chassis" or "cage," and a variety of such rack mounted installations are known in the art.

An example of a conventional rack mounted installation 10 is illustrated in FIG. 1. The rack mounted installation 10 comprises a rack 100 and a number of raceways 51, 52, 53 for routing cables to and from the rack 100. The rack 100 comprises a rectangular-shaped housing 110 having an interior cavity 120 capable of receiving a number of individual computing devices 150. Each of the devices 150 may comprise any type of computing system or device, such as a switch, router, server, etc. Note that one or more of the devices (e.g., the two devices 150 positioned near the center of cavity 120) may comprise controller units for the rack mounted installation. The devices 150 may also be referred to as "blades", "circuit boards", or simply "boards." Generally, the term "blade" will be used herein to refer to a computing device that can be received in a rack 100, such as that shown in FIG. 1. Also, it should be understood that the rack 100 may include other components—e.g., power supplies, fans, etc.—that are not shown in FIG. 1 for ease of illustration.

Many of the blades 150 will each include a number of connectors 155, each connector 155 capable of being coupled with a cable (e.g., an electrical cable or an optical cable). Cables plugged into the connectors 155 on each blade 150 are routed out to the vertical raceways 51, 52 which, in turn, direct the cables vertically upwards to an upper raceway 53 (see arrows 5 in FIG. 1). One prior approach to managing the cables extending from the blades 150 and out to the raceways 51, 52 was to simply run the cables free from their respective blade to one of the raceways 51, 52. However, as the number of ports or connectors 155 on each blade 150 increases, such an approach becomes impractical. When a blade 150 is removed from the rack 100, the spatial relationship amongst the cables, and between the cables and their respective connectors 155 on the removed blade, is not maintained. If these spatial relationships are not maintained or are otherwise not readily ascertainable, it can be very difficult to reconnect the cables to the correct ports on the blade 150 when the blade is re-installed in the rack 100 (or when a different blade having the same port relationships is installed in the rack). In addition, as a practical matter, a lack of an adequate cable management scheme results in tangling amongst the cables and, further, may make it difficult to quickly determine which cables are plugged into a specific blade.

Solutions to the above-described cable management problems have been proposed, these solutions including various structures for guiding cables along a desired route, as well as various clips for holding or bundling cables. Examples of structures for routing cables are disclosed in each of U.S. Pat. No. 6,310,294 to Di Girolamo et al., U.S. Pat. No. 6,501,899 to Marrs et al., U.S. Pat. No. 6,546,181 to Adapathya et al., and U.S. Pat. No. 6,584,267 to Caveney et al., whereas examples of cable clips are disclosed in each of United States Patents Des. 428,330 to Johnston et al., U.S. Pat. No. 6,215,069 to Martin et al., U.S. Pat. No. 6,381,393 to Matthews et al., and U.S. Pat. No. 6,539,161 to Holman et al. These solutions are, however, limited in their ability to route cables in multiple directions (e.g., cables are generally routed only sideways away from the rack). Furthermore, each of the prior art cable management components is, individually, a partial solution to cable management, and none of the proposed solutions presents a unified system for cable management.

SUMMARY OF THE INVENTION

In one embodiment, a cable harness comprises a frame capable of being attached to a rack, the rack having a number of blades disposed therein. The frame includes a number of channels, each channel for routing at least one cable from one of the blades and toward a rear of the rack. The cable harness further comprises a channel array capable of being coupled with the frame. The channel array includes a number of channels, each channel for routing at least one cable from one of the blades and towards one side of the rack.

In another embodiment, a cable clip comprises a longitudinally extending body having a first end and an opposing second end. A number of clasps are disposed on the body between the first and second ends, each of the clasps for holding a cable. A first coupling mechanism is disposed at the first end of the body, the first coupling mechanism for attaching the cable clip to one end of another cable clip. A second coupling mechanism is disposed at the second end of the body, the second coupling mechanism for attaching the cable clip to one end of another cable clip.

In a further embodiment, a bundle clip comprises a hoop-shaped body extending from a first end to an opposing second end and defining an interior region having a size sufficient to receive a number of cables. An entry is disposed between the first and second ends, this entry opening into the interior region and having a size less than a diameter of one of the cables. A first coupling mechanism is disposed on a side of the body, the first coupling mechanism for attaching the bundle clip to another bundle clip. A second coupling mechanism is disposed on an opposing side of the body, the second coupling mechanism for attaching the bundle clip to another bundle clip.

In yet another embodiment, a rack mounted installation comprises a rack, the rack including a generally rectangular housing having an interior cavity. A number of blades are disposed in the interior cavity of the housing, each of at least some of the blades including a number of connectors, each connector for coupling with a cable. The rack mounted installation also includes a cable harness. The cable harness comprises a frame attached to the rack, the frame including a number of channels, each channel for routing at least one cable from one of the blades and toward a rear of the rack. The cable harness further comprises a channel array attached to the frame, the channel array including a number of channels, each channel for routing at least one cable from one of the blades and towards one side of the rack.

In yet a further embodiment, a method comprises securing a first set of cables extending from a blade in a first cable clip, wherein the blade is disposed in a rack, and securing a second set of cables extending from the blade in a second cable clip. The second cable clip is attached to the first cable clip. The method further comprises inserting the first set of cables into a first bundle clip and inserting the second set of cables into a second bundle clip. The second bundle clip is attached to the first bundle clip.

In another embodiment, a method comprises disposing a first group of cables within a first channel of a cable harness, the cable harness installed on a rack. The first channel routes the first group of cables towards a side of the rack. The method further comprises disposing a second group of cables within a second channel of the cable harness, the second channel routing the second group of cables towards a rear of the rack.

BRIEF DESCRIPTION OF THE DRAWINGS

FIG. 5C is a front elevation view of the channel array of FIGS. 5A–5B.

FIG. 5D is side elevation view of the channel array of FIGS. 5A–5B.

FIG. 5E is another side elevation view of the channel array of FIGS. 5A–5B.

FIG. 5F is a perspective view of another embodiment of a channel array, which may comprise part of the cable harness assembly of FIGS. 2 and 3A–3B.

FIG. 5G is a front elevation view of the channel array of FIG. 5F.

FIG. 5H is a side elevation view of the channel array of FIG. 5F.

FIG. 6C is a front elevation view of the front cover of FIGS. 6A–6B.

FIG. 6D is a side elevation view of the front cover of FIGS. 6A–6B.

FIG. 6E is a plan view of the front cover of FIGS. 6A–6B.

FIGS. 7A–7B are perspective views of another embodiment of a front cover, which may comprise part of the cable harness assembly of FIGS. 2 and 3A–3B.

FIG. 7C is a perspective view of another embodiment of a frame, which may comprise part of the cable harness assembly of FIGS. 2 and 3A–3B

FIG. 11C is a plan view of the bundle clip of FIGS. 10A–B.

FIG. 11D is a side elevation view of the bundle clip of FIGS. 10A–B.

FIG. 11E is another plan view of the bundle clip of FIGS. 10A–B.

FIG. 11F is another side elevation view of the bundle clip of FIGS. 10A–B.

FIG. 11G is a further side elevation view of the bundle clip of FIGS. 10A–B.

DETAILED DESCRIPTION OF THE INVENTION

Described below are various embodiments of a cable harness, a cable clip, and a bundle clip for use in routing cables in a rack mounted installation. The cable harness, cable clip, and bundle clip may each be used individually for cable management or, in another embodiment, the cable harness, cable clip, and bundle clip may be used together (or in any suitable combination) as a cable management system. The disclosed embodiments may find application with any type of rack, irrespective of the rack's size or configuration, and irrespective of the type, number, and orientation (e.g., horizontal or vertical) of blades disposed in the rack.

Figure 1:
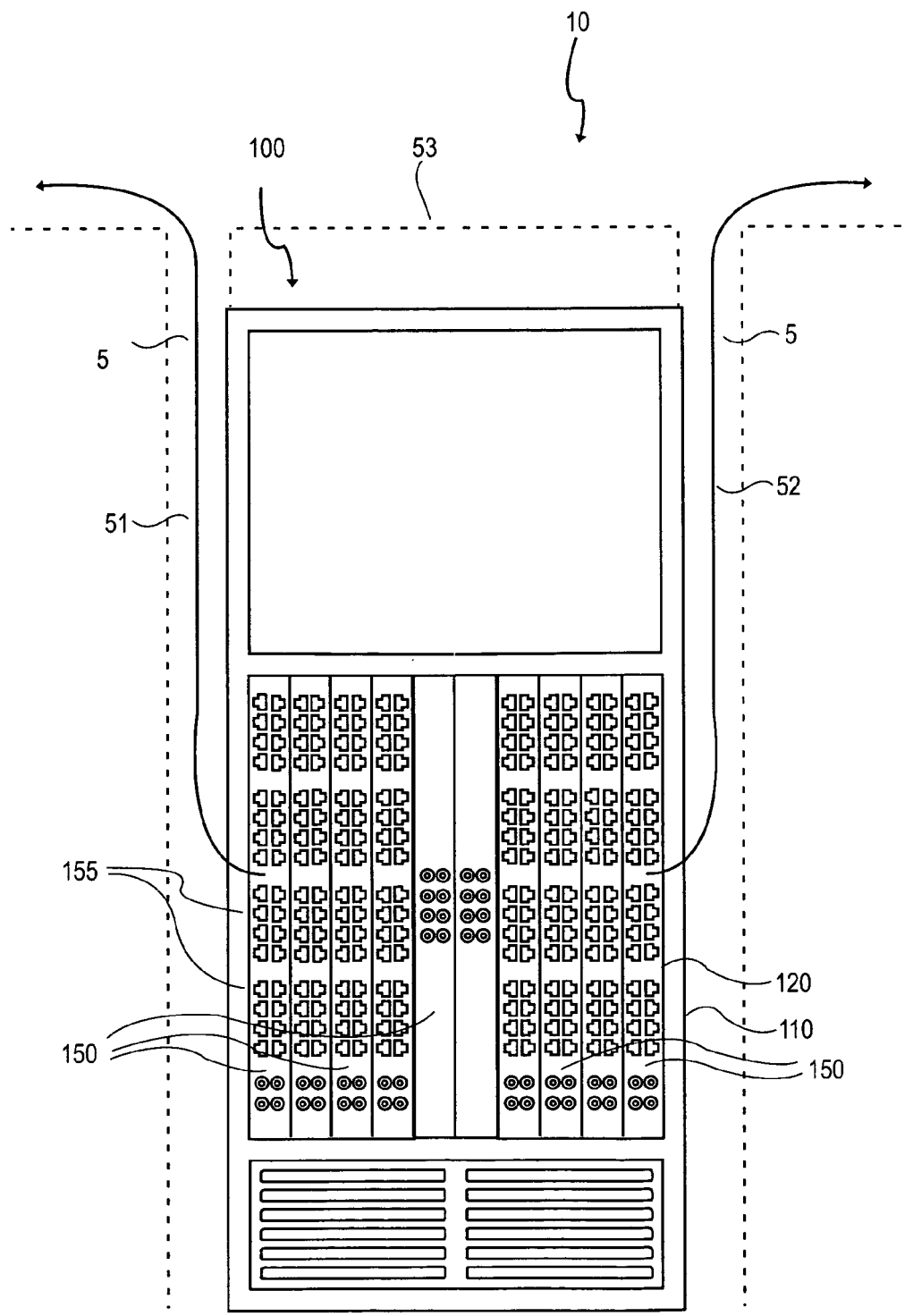
FIG. 1 is a front elevation view of an embodiment of a conventional rack mounted installation.
Figure 2:
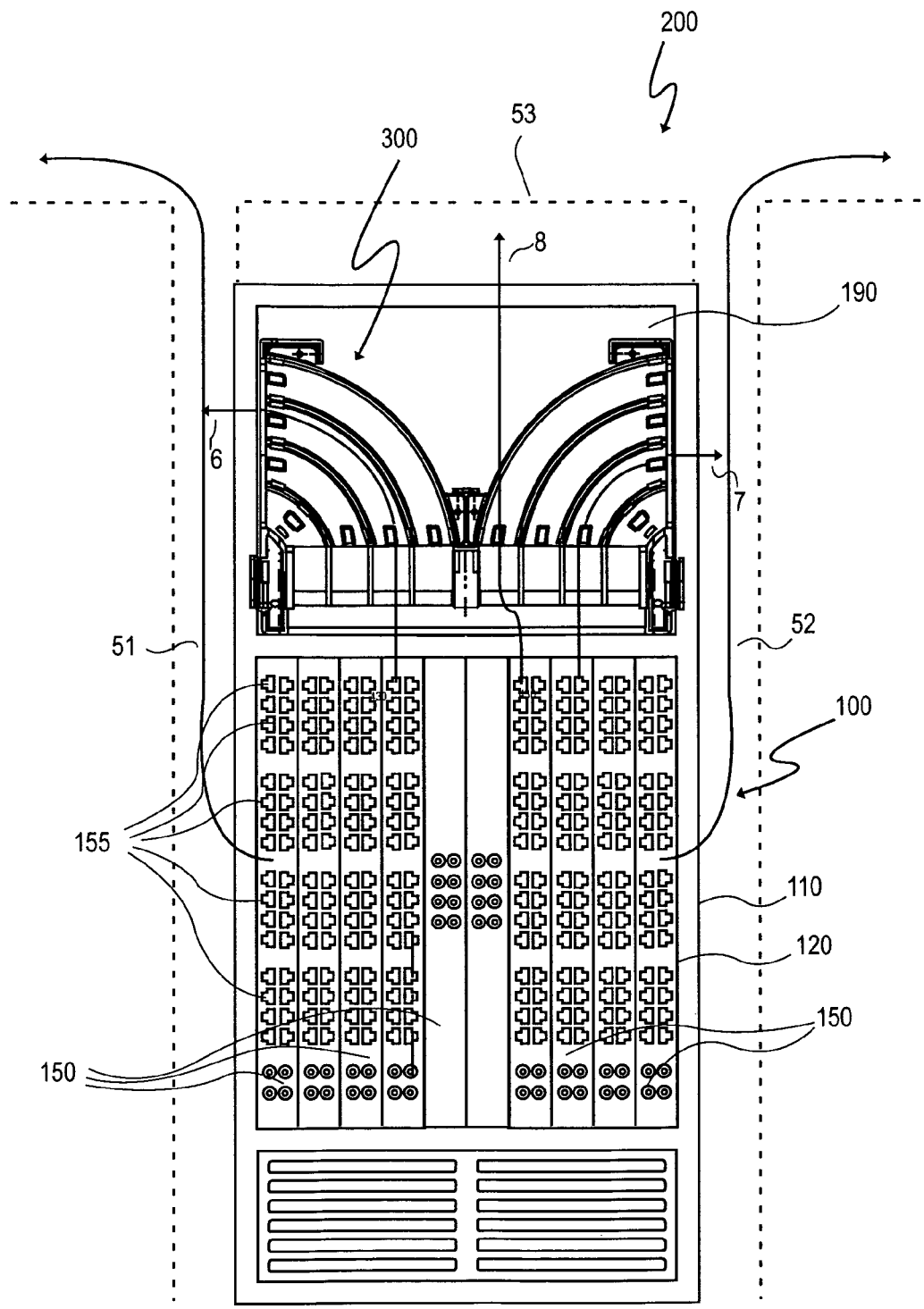
FIG. 2 is a front elevation view of one embodiment of a cable harness assembly, which is shown disposed in the rack mounted installation of FIG. 1.

Turning now to FIG. 2, illustrated is one embodiment of a rack mounted installation 200. The rack mounted installation 200 comprises a rack 100 and a number of raceways 51, 52, 53 for routing cables to and from the rack 100. The rack 100 may be the same or similar to that shown in FIG. 1 above. As previously described, the rack 100 comprises a rectangular-shaped housing 110 having an interior cavity 120 capable of receiving a number of individual blades 150. Each of the blades 150 may comprise any type of computing system or device, such as a switch, router, server, etc. Note that one or more of the blades (e.g., the two blades 150 positioned near the center of cavity 120) may comprise controller units for the rack mounted installation. Each of at least some of the blades 150 will include a number of connectors 155, each connector 155 capable of being coupled with a cable (e.g., an electrical cable or an optical cable). Again, it should be understood that the rack 100 may include other components—e.g., power supplies, fans, etc.—that are not shown in FIG. 2 for ease of illustration. It should also be understood that the rack 100 shown in FIG. 2 is but one example of a rack with which the disclosed embodiments may find application and, further, that the disclosed embodiments may be used with any type of rack or rack mounted installation.

To route the cables that are plugged into the connectors 155 on any of the blades 150, the rack mounted installation 200 further includes a cable harness 300. In one embodiment, the cable harness 300 is disposed in an open cavity 190 within housing 110 that is above the interior cavity 120 (and blades 150). In an alternative embodiment, the cable harness 300 is simply disposed on top of the rack. The cable harness 300 is capable of routing cables from the blades 150 and toward one of the raceways 51, 52, 53. In one embodiment, the cable harness 300 is capable of routing one or more cables outwardly in a direction away from the rack 100 and into the raceway 51 (see arrow 6), is capable of routing one or more cables outwardly in an opposing direction away from the rack 100 and into the raceway 52 (see arrow 7), and is further capable of routing one or more cables towards the rear of the rack 100 and into open cavity 190, such that the cables may be routed vertically upwards (see arrow 8) and into raceway 53.

Figure 3A:
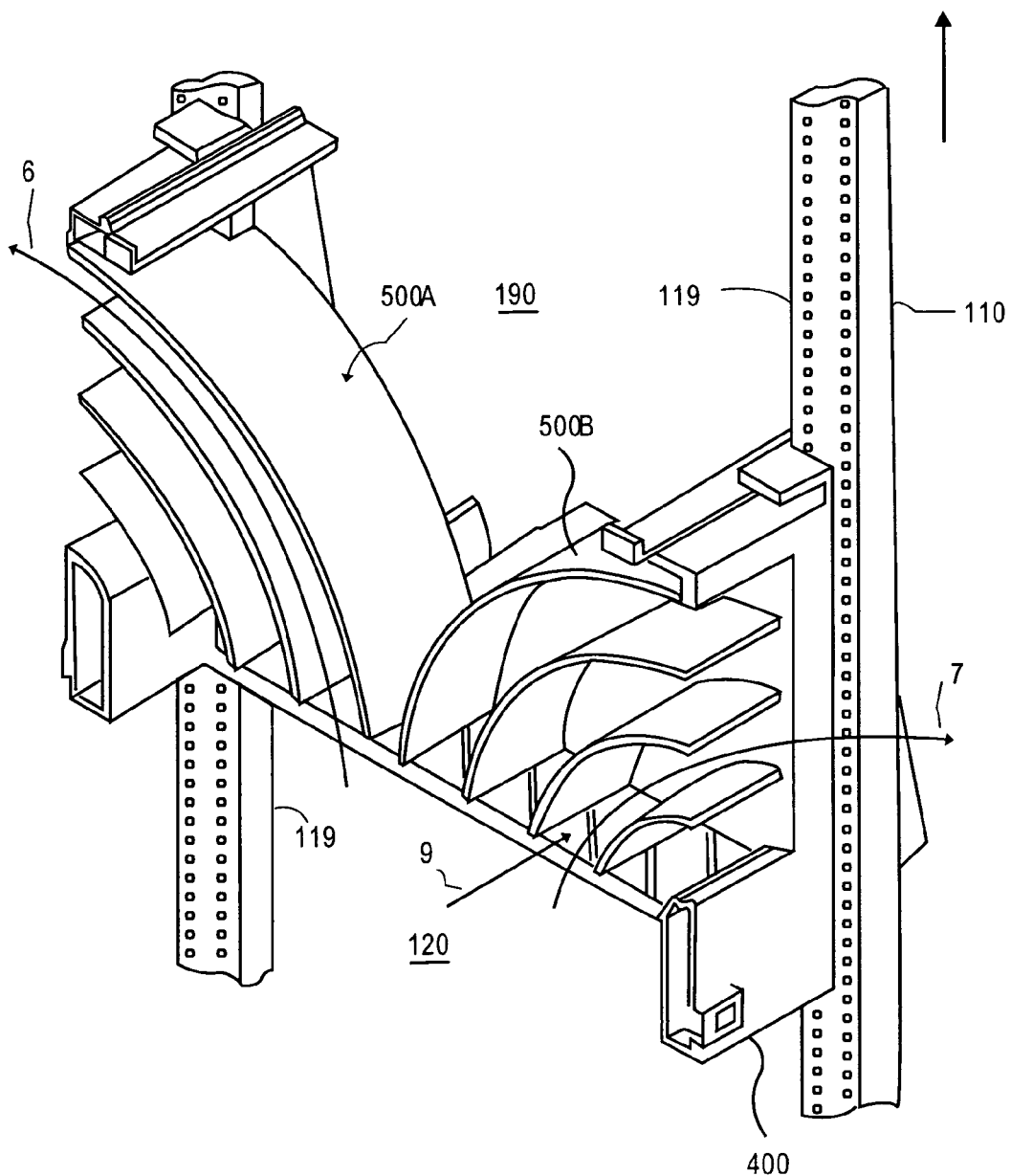
FIG. 3A is a perspective view of the cable harness assembly illustrated in FIG. 2.
Figure 3B:
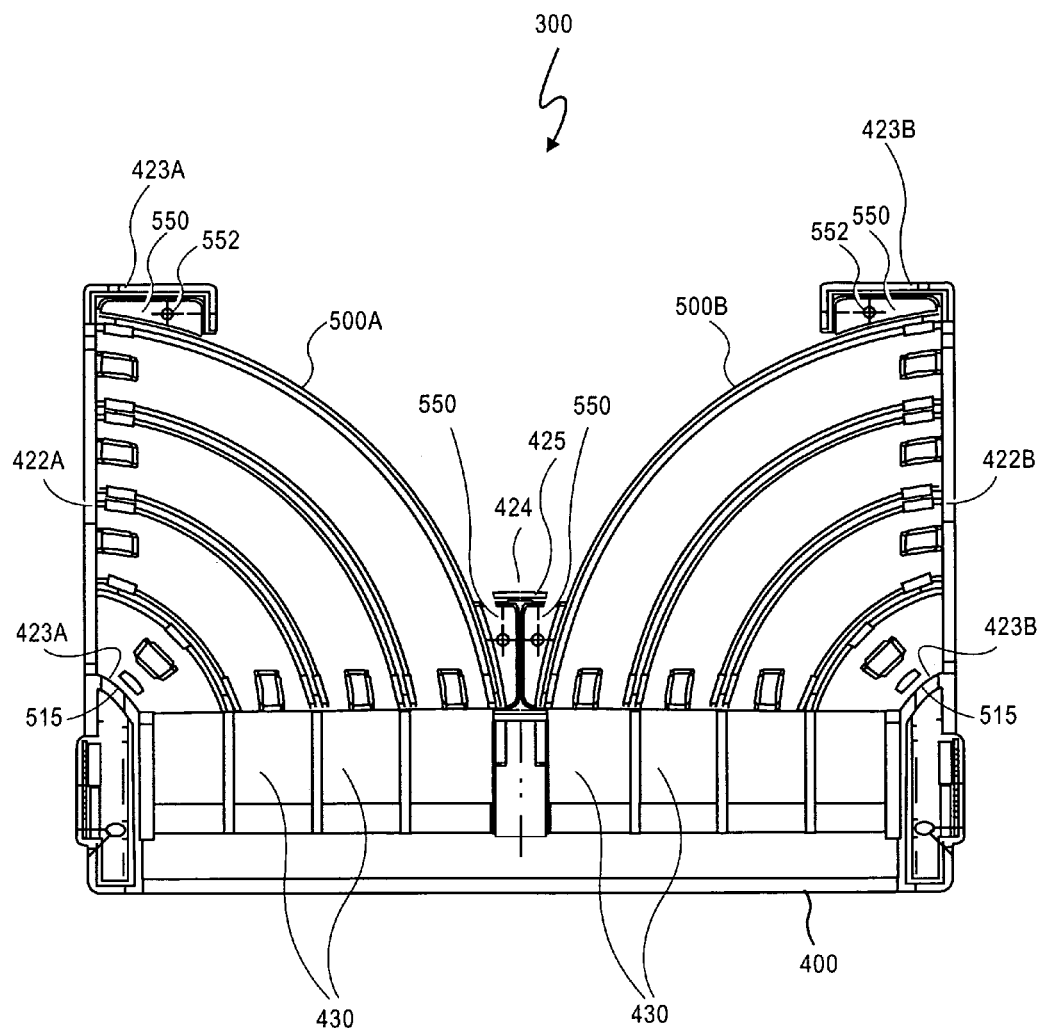
FIG. 3B is a front elevation view of the cable harness assembly illustrated in FIG. 2.
Figure 4A:
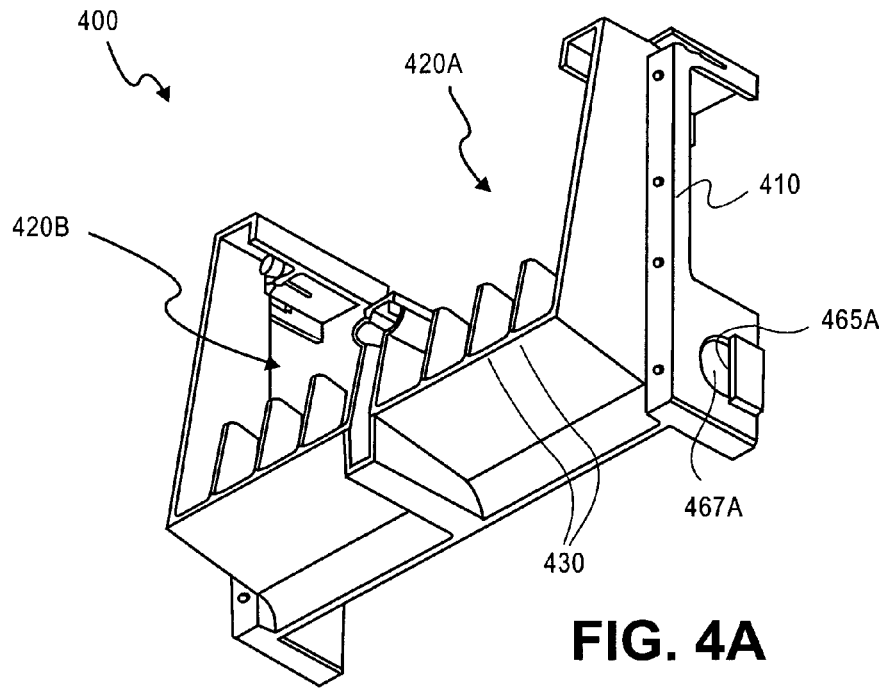
FIGS. 4A–4B are perspective views of one embodiment of a frame, which may comprise part of the cable harness assembly of FIGS. 2 and 3A–3B.
Figure 4B:
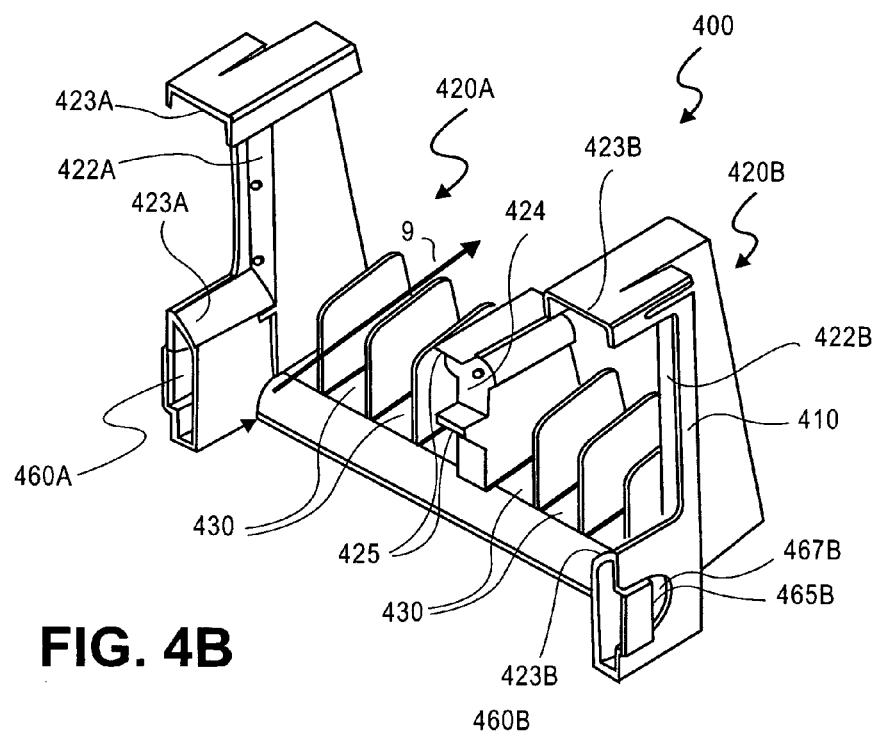
Figure 4D:
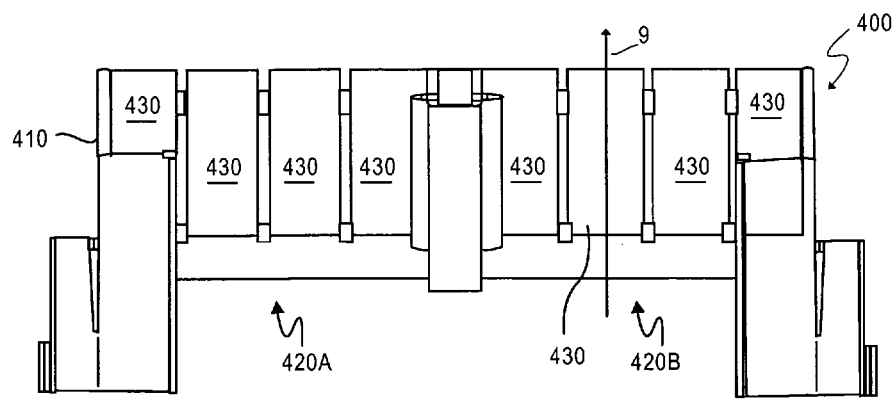
FIG. 4D is a plan view of the frame of FIGS. 4A–4B.
Figure 4C:
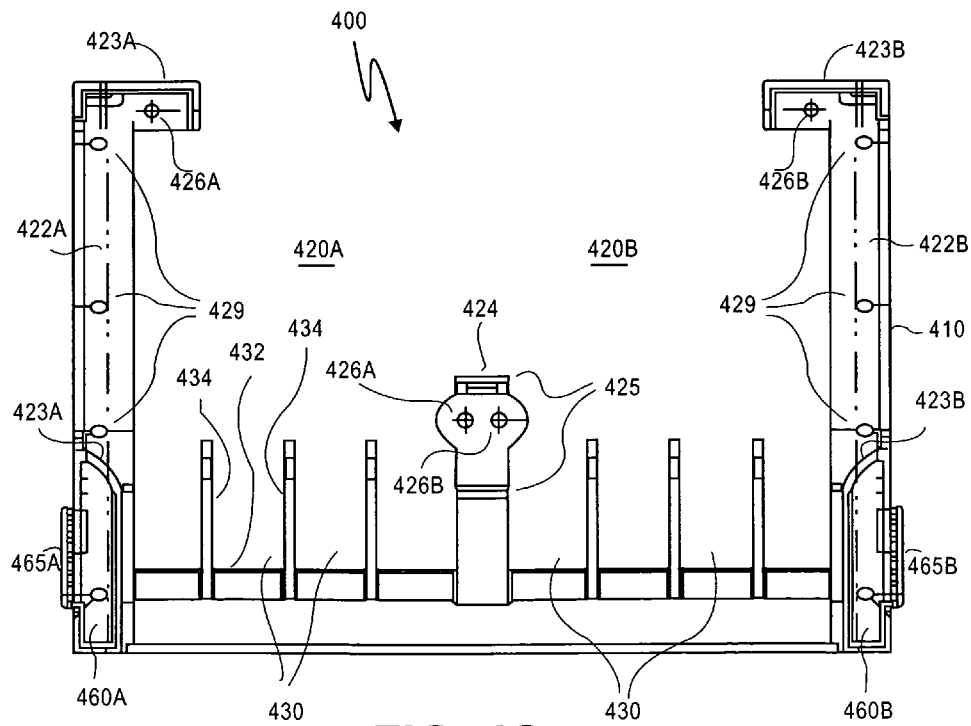
FIG. 4C is a front elevation view of the frame of FIGS. 4A–4B.
Figure 5A:
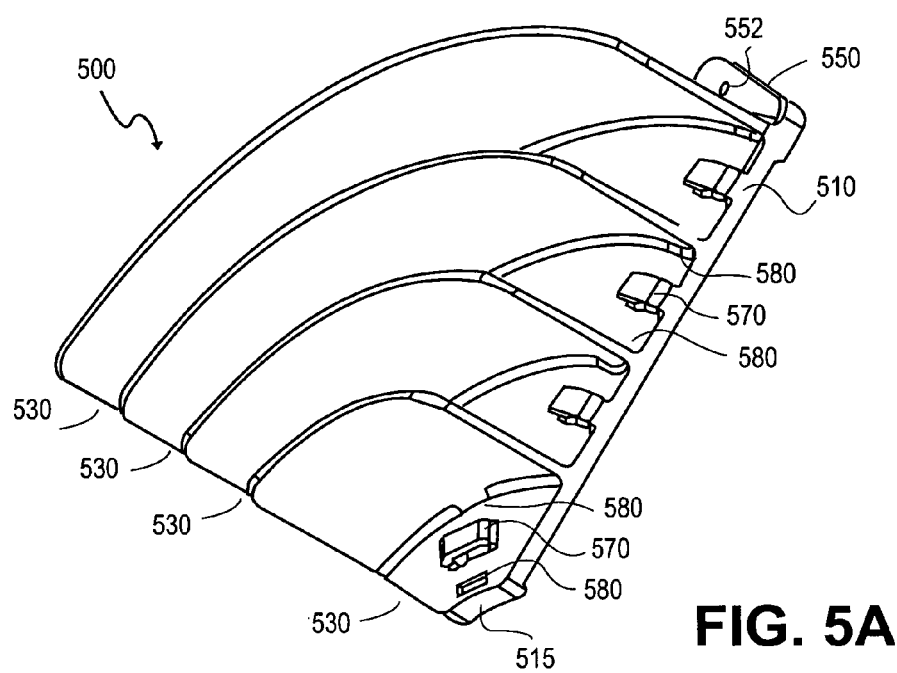
FIGS. 5A–5B are perspective views of one embodiment of a channel array, which may comprise part of the cable harness assembly of FIGS. 2 and 3A–3B.
Figure 5B:
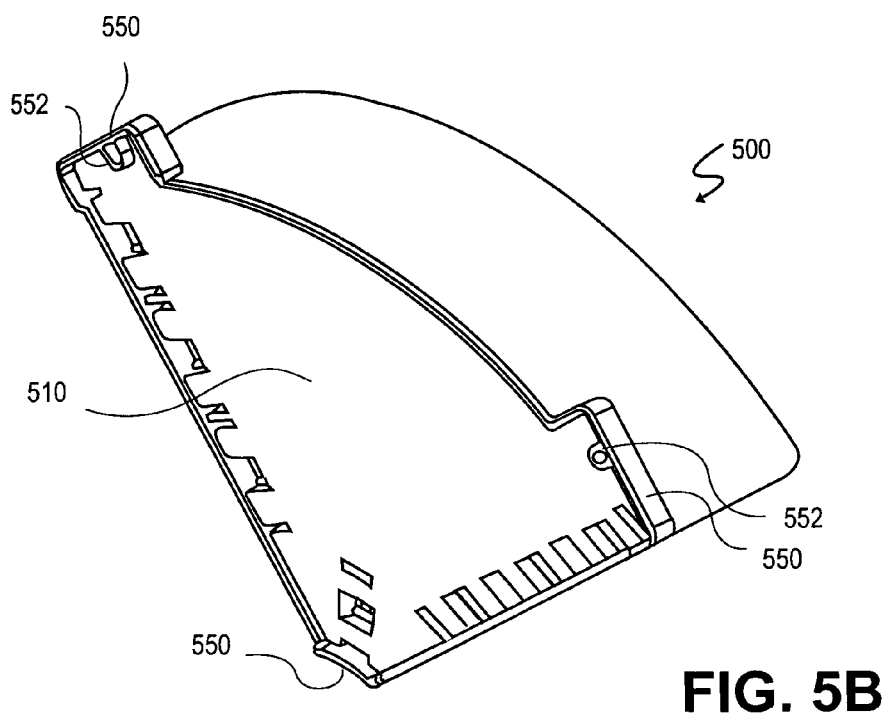

Referring to FIGS. 3A and 3B in conjunction with FIG. 2, one embodiment of the cable harness 300 is now described in greater detail. The cable harness 300 comprises a frame 400, and disposed on the frame 400 is a first channel array 500a and a second channel array 500b. In one embodiment, although not shown in FIGS. 2, 3A, and 3B, the cable harness further includes a front cover (see FIGS. 6A–6E and 7) that can be attached to the frame 400 and, when attached, that overlies the frame 400 and first and second channel arrays 500a, 500b. In yet another embodiment, the cable harness 400 may be used in conjunction with a number of cable clips and/or a number of bundle clips, both of which are described below in greater detail (see FIGS. 8A through 14 and the accompanying text below).

One embodiment of the frame 400 is illustrated in FIGS. 4A through 4D. With reference to these figures, as well as FIGS. 3A–3B, the frame 400 comprises a generally rectangular-shaped body 410 that defines a first bay 420a and a second bay 420b. Each of the bays 420a, 420b is sized and configured to receive one of the channel arrays 500a, 500b, as shown in FIGS. 3A–3B. The frame 400 may be constructed from any suitable material, such as a plastic material, and in another embodiment, the frame 400 is constructed using a molding process (e.g., injection molded plastic). In a further embodiment, the frame 400 is constructed as a single part (as may be achieved by, for example, an injection molding process).

The bay 420a is defined by a center post 424 and an upright post 422a, as well as guide elements 423a extending from upright post 422a and a guide element 425 extending from the center post 424. Similarly, the second bay 420b is defined by the center post 424 and an opposing upright post 422b, as well as guide elements 423b extending from the upright post 422b and the guide element 425 on center post 424. Any suitable fasteners or method of attachment may be used to secure the channel arrays 500a, 500b to the frame 400. In one embodiment, a number of holes 426a (disposed on upright post 422a and center post 424) are associated with the first bay 420a, and a number of holes 426b (disposed on upright post 422b and center post 424) are associated with the second bay 420b. The channel array 500a may then be secured to the frame 400 within bay 420a using threaded fasteners (or other suitable fasteners) that are inserted through corresponding holes (e.g., holes 552, as described below) in the channel array 500a and into the holes 426a on frame 400, wherein the channel array 500a is supported in the frame 400 by upright post 422a, center post 424, and guide elements 423a, 425. Similarly, the channel array 500b is secured to the frame 400 within bay 420b using threaded fasteners that are inserted through corresponding holes in the channel array 500b and into the holes 426b on frame 400, the channel array 500b being supported in the frame 400 by upright post 422b, center post 424, and guide elements 423b, 425. In another embodiment, the channel arrays 500a, 500b are secured to the frame 400 using a "snap-fit" technique. In a further embodiment, a "snap-fit" technique is employed to initially secure the channel arrays 500a, 500b to the frame 400, such that the channel arrays are held in place on the frame while fasteners are inserted to attach the channel arrays to the frame.

The frame 400 also includes or defines a number of channels 430. Each of the channels is capable of receiving one or more cables (each cable coupled with one of the blades 150) and routing the cables in a direction toward the rear of the rack 100 (see arrow 9 in each of FIGS. 4B and 4D). Once directed into the open cavity 190 and toward the rear of the rack 100, the cables can be routed upwardly (see arrow 8 in FIG. 2) towards the upper raceway 53. Each of the channels 430 is defined by a floor 432 and opposing sidewalls 434 extending upwardly from the floor 432. Note also that, as best seen in FIG. 3B, the channels 430 lie below the first and second bays 420a, 420b (and the channel arrays 500a, 500b), which allows for the routing of cables into the channels 430 when the channel arrays 500a, 500b are installed on the frame 400. The frame 400 may include any suitable number of channels 430 (e.g., eight, as shown in the figures), the selected number of channels for a given application being a function of a number of factors, including the size of the rack 100, the number of blades 150, the number of connectors 155 per blades, the diameter of the cables, etc.

The frame 400 may be secured to the rack 100 using any suitable fasteners or method of attachment. In one embodiment, the frame 400 is coupled with the rack using a number of threaded fasteners (or other suitable fasteners). The fasteners may be inserted through holes 429 disposed on the frame 400 (e.g., on upright posts 422a, 422b) and into corresponding holes 119 on the rack 100 (see FIG. 3A). It should, however, be understood that any other system or method for securing the frame 400 (or, more generally, the cable harness 300) to the rack 100 may be employed, such as a "snap-fit" attachment scheme, a magnetic coupling (created by installing magnets in the frame 400 and, perhaps, in the rack housing 110), etc.

One embodiment of a channel array 500 (e.g., either channel array 500a or channel array 500b, as these two components are, in one embodiment, the same) is illustrated in FIGS. 5A through 5E. The channel array 500 comprises a generally quarter circle-shaped body 510 that defines a number of channels 530. The channel array 500 may be constructed from any suitable material, such as a plastic material, and in another embodiment, the channel array 500 is constructed using a molding process (e.g., injection molded plastic). In a further embodiment, the channel array 500 is constructed as a single part (as may be achieved by, for example, an injection molding process).

As previously noted, the channel array body 510 includes a number of channels 530. Each channel 530 extends through an approximate ninety degree (90°) arc and is defined by a floor 532 and two opposing walls 534 extending upwards from the floor 532. Each of the channels is capable of receiving one or more cables (each cable coupled with one of the blades 150) and routing the cables in a direction away from the rack 100 and that is towards a side of the rack, such that the cables can be routed into one of the raceways 51, 52 (see FIG. 2, arrows 6 and 7). The channel array 500 may include any suitable number of channels 530 (e.g., four, as shown in the figures), the selected number of channels for a given application being a function of a number of factors, including the size of the rack 100 (and frame 400), the number of blades 150, the number of connectors 155 per blade, the diameter of the cables, etc.

In FIGS. 3A–3B and 5A–5E, the channels 530 of the channel arrays 500 are generally rectangular in cross-section. However, it should be understood that the channels 530 may have any suitable shape and configuration. By way of example, an alternative embodiment of a channel array is shown in FIGS. 5F through 5H. The channel array 500* of FIGS. 5F–5H is similar to the embodiment shown in FIGS. 5A–5E; however, note that each channel 530 of channel array 500* is defined by a semicircular shaped floor 532 and a pair of opposing walls 534 extending upwards from the floor.

To secure the channel array 500 within the frame 400, the channel array 500 includes two tabs 550 extending from body 510. Each of the tabs 550 is sized and configured to be slidably received in the upper guide element 423a on upright post 422a (or upper guide element 423b on upright post 422b), and each of the tabs 550 is also sized and configured to be slidably received in the guide element 425 on center post 424. Referring to FIGS. 3A and 3B, when the channel array 500 is installed on the frame 400, one of the tabs 550 will mate with the upper guide element 423a on upright post 422a (or upper guide element 423b on upright post 422b) and the other of the guides 550 will mate with the guide element 425 on center post 424. Also, when the channel array 500 is installed on the frame 400, a surface 515 on the body 510 will abut against (or at least be in close proximity to) the lower guide element 423a on upright post 422a (or the lower guide element 423b on upright post 422b). In one embodiment, the tabs 550 each include a hole 552 for receiving a fastener (e.g., a threaded fastener) that can be used to attach the channel array 500 to the frame 440 by inserting the fasteners into the holes 426a (or 426b) on the frame, as noted above. Any suitable number of fasteners may be used to secure a channel array to the frame 400. For example, the channel array 500* of FIGS. 5F–5H includes additional holes 553—only one of the two holes 553 being used, depending upon which bay 420a, 420b of frame 400 that the channel array 500* is mounted in—for receiving an additional fastener that attaches the channel array 500* to frame 400, which includes an additional hole on each of the upright posts 422a, 422b (see FIG. 7C, items 427a, 427b) for receiving such a fastener.

It should be noted that, although two channel arrays 500a, 500b are shown attached to the frame 400 in FIGS. 2–3B, only a single channel array 500 (or no channel arrays) may be installed on the frame 400. Whether two, one, or no channel arrays 500 are secured to the frame 400 is a function of the specific cable routing requirements for any given rack mounted installation. Furthermore, because the channel arrays 500 are modular in nature, an additional channel array 500 may be added to the frame 400 (provided one of the bays 420a, 420b is open) at any time to satisfy a demand for increased cable routing capacity. Likewise, a channel array 500 may be removed from the frame 400 at any time, if desired.

In one embodiment, disposed within each of the channels 530 is a hook (or hooks) 570, and in a further embodiment, a pair (or pairs) of opposing slots 580 are formed within each of the channels 530. The hook 570 and/or the pair of opposing slots 580 enables the use of various types of anchors or ties to bundle a group of cables together within a channel 530 and to secure the bundle of cables within that channel. By way of example, a tie may comprise a Velcro strap, a twist tie, or other type of anchoring device. The tie may be secured to the channel array body 510 using the hook 570 and/or the pair of opposing slots 580. For example, where a Velcro strap is used, the strap may be routed through one of the opposing slots 580, underneath the channel floor 532, and up through the other of the slots 580. Alternatively, the Velcro strap may simply be secured around the hook 570. It should be understood that a channel array may include only one of the hook 570 and the opposing slots 580 or neither of these elements. For example, the channel array 500* of FIGS. 5F–5H includes only hooks 570.

As noted above, in one embodiment, the cable harness includes a cover, and an embodiment of a cover 600 is illustrated in FIGS. 6A through 6E. Referring to these figures, the cover 600 comprises a generally rectangular-shaped body 610 having a front side 611 and an opposing back side 612. Extending from the back side 612 of cover body 610 are opposing upper registration elements 621 and opposing lower registration elements 622, as well as opposing locking mechanisms 630a, 630b. The cover 600 may also include a display area 650 for receiving a sheet of paper (or cardboard or other material upon which markings can be made) upon which notations can be made regarding the identification of cables within each channel 430, 530 of the cable harness. The paper sheet may be attached to the display area 650 using tabs 655 (or using a clear plastic cover placed over the paper sheet and secured to tabs 655), or by any other suitable attachment scheme (e.g., an adhesive).

The cover 600 may be constructed from any suitable material, such as a plastic material, and in another embodiment, the cover 600 is constructed using a molding process (e.g., injection molded plastic). In a further embodiment, the cover 600 is constructed as a single part (as may be achieved by, for example, an injection molding process). In yet another embodiment, the cover body 610 includes a number of support ribs 617 formed on the body's backside 612, these support ribs 617 providing structural support and rigidity (e.g., resistance to bending) for the cover.

Figure 6A:
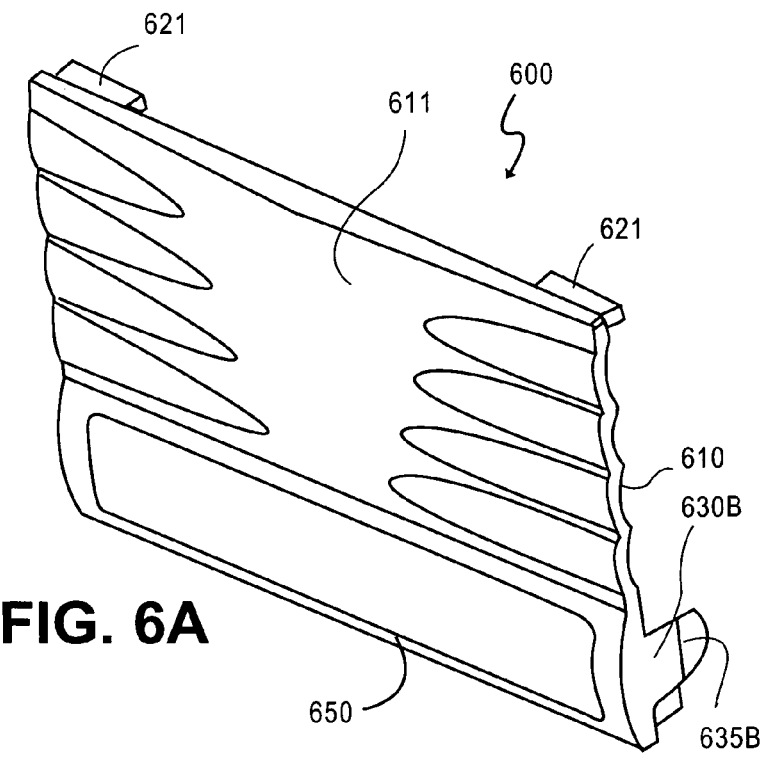
FIGS. 6A–6B are perspective views of one embodiment of a front cover, which may comprise part of the cable harness assembly of FIGS. 2 and 3A–3B.
Figure 6B:
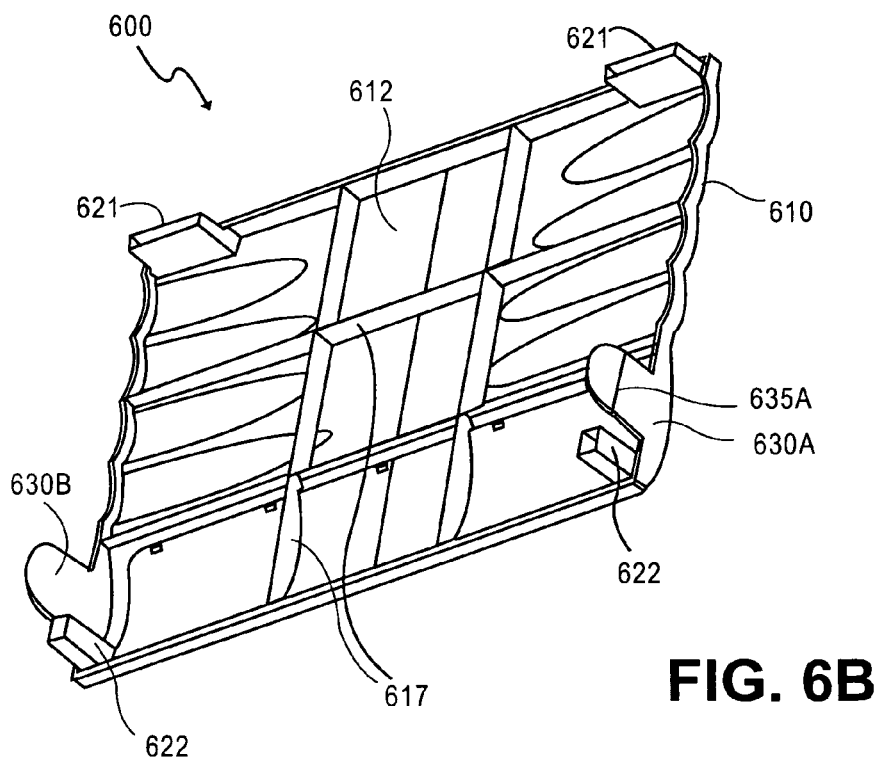
Figure 6F:
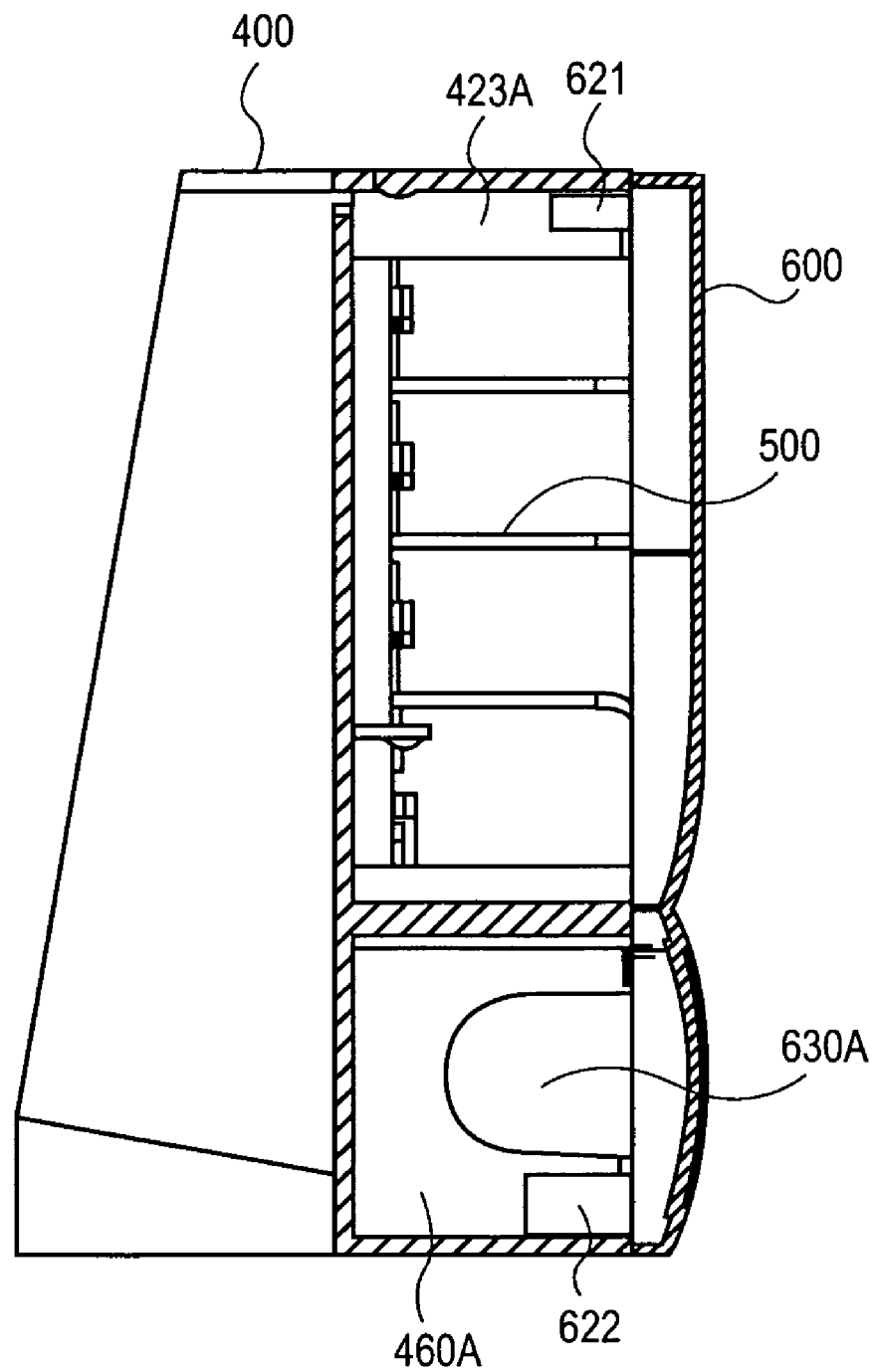
FIG. 6F is a cross-sectional view showing installation of the front cover of FIGS. 6A–6E on the cable harness assembly of FIGS. 2 and 3A–3B.
Figure 8A:
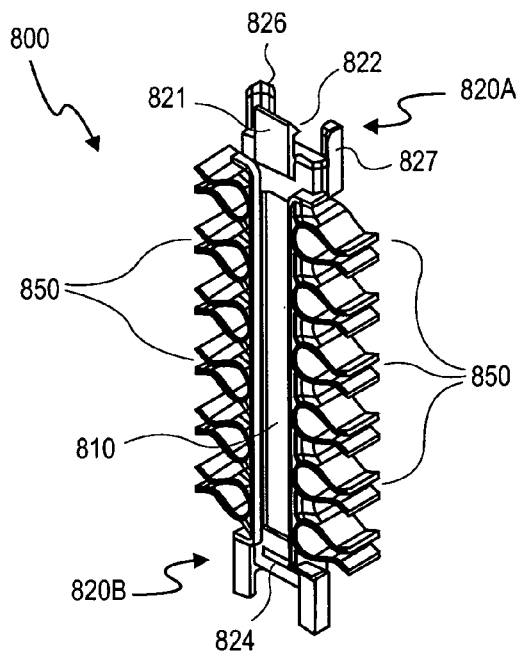
FIG. 8A is a perspective view of one embodiment of a cable clip.
Figure 8E:
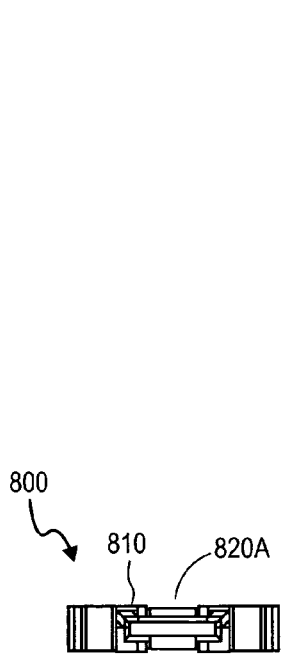
FIG. 8E is a plan view of the cable clip of FIG. 8A.
Figure 8B:
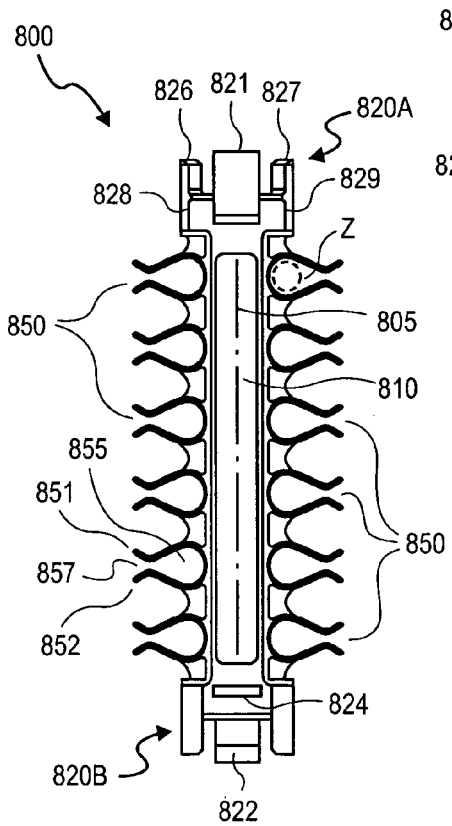
FIG. 8B is a front elevation view of the cable clip of FIG. 8A.
Figures 8C, 8D:
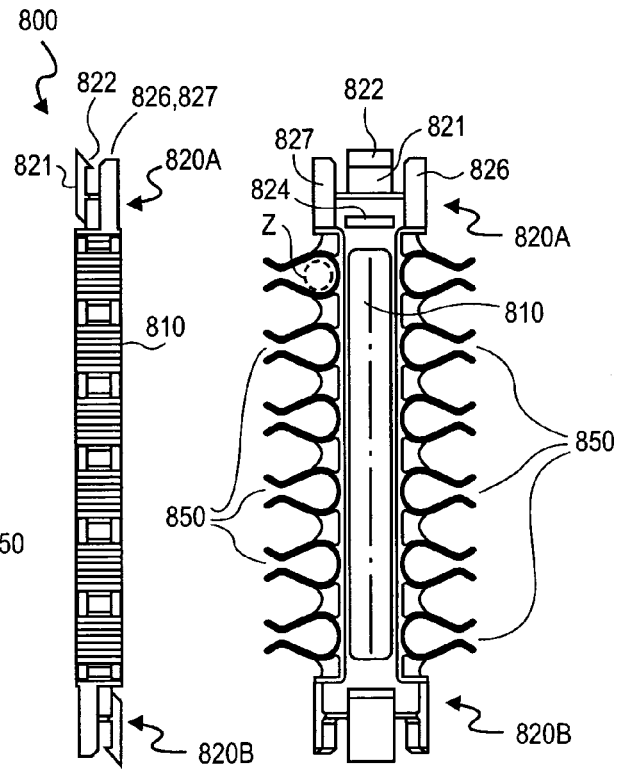
FIG. 8C is a side elevation view of the cable clip of FIG. 8A.
FIG. 8D is a rear elevation view of the cable clip of FIG. 8A.

The registration elements 621, 622 function to locate the cover 600 on frame 400 and to help secure the cover on the frame. The upper registration elements 621 are sized and configured to be slidably received in the upper guide elements 423a, 423b on the upright posts 422a, 422b, respectively, of the frame 400 (in a manner similar to tabs 550 on channel array 500). The lower registration elements 622 are sized and configured to be slidably received in opposing slots 460a, 460b extending from the upright posts 422a, 422b, respectively (see FIGS. 4A–4D). The interface between the cover 600 and frame 400 is illustrated in FIG. 6F, which shows a cross-sectional side view of the cable harness 300 with the cover installed on the frame. Referring to this figure, one of the upper registration elements 621 is seen extending into the upper guide element 423a, whereas one of the lower registration elements 622 is seen extending into the slots 460a. The registration elements 621, 622, when engaged with their respective upper guide elements 423a–b and slots 460a–b, function to both locate the cover 600 on the frame 400 and inhibit relative movement between the frame and cover.

In one embodiment, as shown in the figures, each of the locking mechanism 630a, 630b comprises a resiliently flexible arm having a protrusion 635a, 635b disposed on an end of the arm, respectively. When the cover 600 is placed on the frame 400, each of the locking mechanisms 630a, 630b is inserted into a corresponding one of the opposing slots 460a, 460b on the frame 400 (see FIG. 6F), wherein the protrusions 635a, 635b on the locking mechanisms 630a, 630b engage mating retaining elements 465a, 465b, respectively, on the frame 400 to lock the cover 600 onto the frame. To unlock and remove the cover 600, the locking mechanisms 630a, 630b are depressed (e.g., by pushing on the locking mechanism through apertures 467a, 467b adjacent the retaining elements 465a, 465b) to disengage the protrusions 635a, 635b on the locking mechanisms from the retaining elements 465a, 465b, respectively.

Those of ordinary skill in the art will appreciate that the particular configuration of the cover 600, and the manner in which this component is attached to the frame 400, are but matters of design choice left to the designer. As an example, an alternative embodiment of the cover is shown in FIGS. 7A and 7B, and an alterative embodiment of the frame is shown in FIG. 7C. The frame 400* of FIG. 7C and the cover 600* of FIGS. 7A–7B are generally similar to the frame 400 of FIGS. 4A–4C and the cover 600 of FIGS. 6A–6E, respectively. However, the cover 600* is secured to frame 400* by an opposing pair of resiliently flexible arms 480a, 480b disposed on a cross-member 470 of frame 400* (note that the cross-member 470 also functions as the upper guide elements for the channel arrays 500 or 500*). Flexible arms 480a, 480b interface with a mating pair of tabs 680a, 680b disposed on the cover 600*. The cover 600* is further secured to the frame 400* by an opposing pair of extensions 690a, 690b disposed on cover 600* that are sized and configured to be received in mating apertures 490a, 490b on frame 400*. The extensions 690a, 690b include downwardly extending protrusions 691 that, when inserted through apertures 490a, 490b, are "captured" in their respective aperture to secure the lower portion of the cover 600* to the frame 400*. To attach the cover 600* to frame 400*, the extensions 690a, 690b are placed in their respective apertures 490a, 490b on the cover, and the resiliently flexible arms 480a, 480b are "snapped" into place over the mating tabs 680a, 680b on the cover.

To use the cable harness 300 for cable management, the frame 400 is attached to the rack 100, and a desired number of channel arrays 500 (e.g., two, one, or none) are secured to the frame. Cables are plugged into the blades 150, and each cable is placed in one of the channels 430 on frame 400 or in one of the channels 530 on one of the channel arrays 500. If a cable is placed in a channel 430 of the frame 400, the cable is then routed through the rack's open cavity 190 to the rear of the rack, where the cable can then be directed upwards to the upper raceway 53. If a cable is placed in a channel 530 of a channel array 500, the cable is then routed outwards toward one side of the rack 100 and into one of the vertical raceways 51, 52, where the cable can then be directed upwards and into the upper raceway 53. All the cables placed in a channel 530 on one of the channel arrays 500 may be secured together in a bundle using a tie (e.g., a Velcro strap), and this tie can then be secured to the channel array body 510 using the hook 570 or the pair of opposing slots 580 associated with that channel. In one embodiment, all of the cables disposed within a given channel 430, 530 originate from the same blade 150 (in other words, each of the channels 430, 530 is dedicated to a single blade 150). Once all the cables have been disposed in the cable harness 300, the cover 600 may be secured to the frame 400.

As noted above, in one embodiment, the above-described cable harness 300 may be used in conjunction with a cable clip and/or in conjunction with a bundle clip. Embodiments of the cable clip and embodiments of the bundle clip will now be described. It should be understood, however, that each of the disclosed cable clip and bundle clip may be used individually without the cable harness 300 (or individually with the cable harness) and, further, that the disclosed cable and bundle clips may be used together, with or without the cable harness 300.

Referring now to FIGS. 8A through 8E, an embodiment of a cable clip 800 is illustrated. The cable clip 800 comprises a longitudinally extending body 810 having a first coupling mechanism 820a at one end of the body and a second coupling mechanism 820b at an opposing end of the body. Disposed on opposing sides of the body is a plurality of clasps 850, each clasp able to secure a cable 2 (shown in dashed line in FIGS. 8B and 8D) to the clip body 810. The clip 800 may be constructed from any suitable material, such as a plastic material, and in another embodiment, the clip 800 is constructed using a molding process (e.g., injection molded plastic). In a further embodiment, the clip 800 is constructed as a single part (as may be achieved by, for example, an injection molding process).

Each of the clasps 850 is capable of receiving and holding a cable 2, as noted above. The cable 2 may be any type of cable, whether electrical (e.g., copper wire) or optical (e.g., an optical fiber). In one embodiment, each clasp 850 comprise an opposing pair of resiliently flexible arms 851, 852 extending from the clip body 810. The opposing arms 851, 852 define an interior region 855, this interior region having a size and shape that is able to receive a cable 2. The actual size of this region 855 will depend upon the diameter of the cables with which the clip 800 is intended to be used. The opposing arms 851, 852 also define a relatively narrower entry 857, the entry 857 opening into the interior region 855. The entry 857 should have a size that is sufficiently small to prevent the escape of a cable from the clasp 850. Note that, in one embodiment, the clasps 850 may be designed for use with cables of various diameters (e.g., a copper cable and a relatively smaller optical fiber cable). In this embodiment, the entry 857 should be sized to prevent escape of the smaller diameter cable, whereas the interior region 855 should be sized to receive the larger diameter cable.

To insert a cable 2 into one of the clasps 850, the cable is pressed into the entry 857—note that the ends of arms 851, 852 may each be bent outwardly to facilitate insertion of a cable at the entry—and the force of the cable against the opposing arms 851, 852 causes each of the arms to elastically bend outwardly. When the elastic deformation of the opposing arms 851, 852 is sufficient to extend the width of the entry 857 to a distance that allows passage of the cable (e.g., the entry 857 has a width approximately equal to a diameter of the cable), the cable will pass through the entry 857 and into the interior region 855. Upon passage of the cable 2 into the interior region 855, the opposing arms 851, 852 will return to their initial, undeformed state.

The clip 800 may include any suitable number of clasps 850. The actual number of clasps 850 selected may depend upon a variety of factors, including the diameter of the cable, the number of connectors 155 on each blade 150, and the arrangement of the connectors on each blade. In one embodiment, the number of clasps 850 on a clip 800 is sufficient to hold a designated portion of the cables extending from a blade, wherein other portions of the total number of cables are held by other clips. For example, where a blade includes forty-eight connectors arranged in four 2×6 arrays, one clip 800 may hold the cables associated with one of the 2×6 arrays of connectors. Thus, a total of four clips 800 may be used to hold all cables plugged into that blade 150, and these four clips may be attached together end-to-end by the coupling mechanisms 820a, 820b, as will be explained below.

As noted above, the clip 800 includes an opposing pair of coupling mechanism 820a, 820b, and these coupling mechanism can be used to interconnect any number of the clips together in an end-to-end configuration. In one embodiment, as illustrated in FIGS. 8A–8E, as well as FIGS. 9A–10, the coupling mechanisms 820a, 820b are identical (or at least substantially similar); however, the first coupling mechanism has an orientation on the body 810 that is 180 degrees apart (as measured about the center 805 of the longitudinally extending body 810) from the orientation of the second coupling mechanism 820b. Each coupling mechanism comprises a resiliently flexible arm 821 extending from an end of the clip body 810, and a protrusion 822 extends from an outer end of the arm 821. Disposed on opposing sides of the flexible arm 821 and extending from the clip body 810 are guide posts 826, 827. Disposed on opposing sides of the flexible arm 821 and adjacent the guide posts 826, 827 are guide surfaces 828, 829, respectively. Also, each coupling mechanism includes a notch 824 disposed on the body 810 (on a side of the body opposing the side upon which the arm 821 is disposed).

Figure 9A:
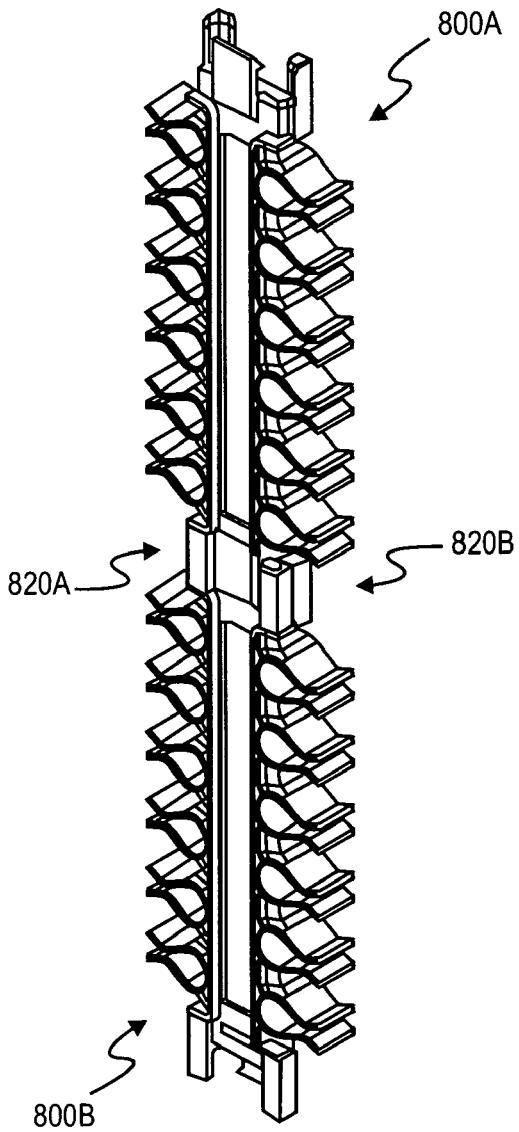
FIG. 9A is a perspective view illustrating interconnection of two of the cable clips shown in FIGS. 8A–8E.
Figure 9B:
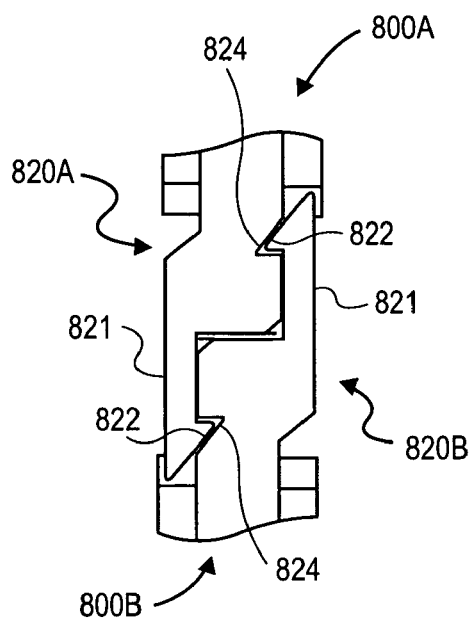
FIG. 9B is a schematic diagram further illustrating interconnection of the two cable clips shown in FIG. 9A.
Figure 9C:
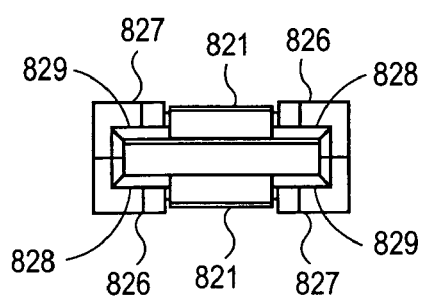
FIG. 9C is a schematic diagram further illustrating interconnection of the two cable clips shown in FIG. 9A.

Interconnection of two of the clips 800 is illustrated in FIGS. 9A through 9C. Referring first to FIG. 9A, a first clip 800a is attached to a second clip 800b. The coupling mechanism 820a on clip 800a is coupled with the coupling mechanism 820b on clip 800b. When the two clips 800a, 800b are connected together, the protrusion 822 on the flexible arm 821 of the coupling mechanism 820a rests within the notch 824 of the coupling mechanism 820b, and the protrusion 822 on the flexible arm 821 of the coupling mechanism 820b rests within the notch 824 of the coupling mechanism 820a. This is further illustrated in FIG. 9B, which is a schematic diagram showing the interaction between the coupling mechanisms 820a, 820b of the interconnected clips 800a, 800b, respectively. As shown in FIG. 9B, the protrusion 822 on the arm 821 of each coupling mechanism 820a, 820b, respectively, is disposed in the mating notch 824 of the other coupling mechanism. The elastic nature of the flexible arms 821 allows the arms to deform during the connection process and, when fully engaged, to return to an undeformed (or partially deformed) state, such that each of the protrusions 822 lies within its mating notch 824. In addition, the guide posts 826, 827 on each of the coupling mechanisms 820a, 820b mate with the guide surfaces 828, 829 of the opposing coupling mechanism, which is illustrated in FIG. 9C. Thus, the mating protrusions 822 and notches 824 inhibit separation (in a direction along centerline 805) of the clips 800a, 800b, and the mating guide posts 826, 827 and guide surfaces 828, 829 function to inhibit relative movement (in a direction perpendicular to centerline 805) between the clips 800a, 800b, thereby providing (in one embodiment) a rigid connection between the two clips 800a, 800b.

Figure 9D:
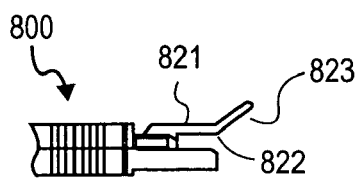
FIG. 9D is a partial side elevation view of an alternative embodiment of the cable clip of FIGS. 8A–8E.

The clips 800a, 800b may be separated by pulling apart on the clips with a force sufficient to overcome the forces developed between the notches 824 and protrusions 822 under the elastic deformation of the flexible arms 821. To aid in separating the two interconnected clips 800a, 800b, the flexible arm 821 may include an angled extension 823, as shown in the alternative embodiment of FIG. 9D. The angled extension 823 functions as a handle that enables the user to pull upwardly on the flexible arm 821 in order to release the protrusion 822 from its mating notch 824 on the other clip, thereby allowing two interconnected clips to be easily separated. Note also that, in another embodiment, which is also illustrated in FIG. 9D, the protrusion 822 on flexible arm 821 may be slightly rounded to make extraction from mating notch 824 easier (e.g., a lesser force would be needed to overcome the forces developed between the notches 824 and protrusions 822 under the elastic deformation of the flexible arms 821).

It should be understood that the coupling mechanisms 820a, 820b illustrated in FIGS. 8A–8E and 9A–9C are but one example of the manner in which two (or more) of the cable clips 800 may be interconnected. Those of ordinary skill in the art will appreciate that any other suitable interconnection scheme or device may be employed to connect two or more of the clips 800 together in an end-to-end fashion.

Figure 10:
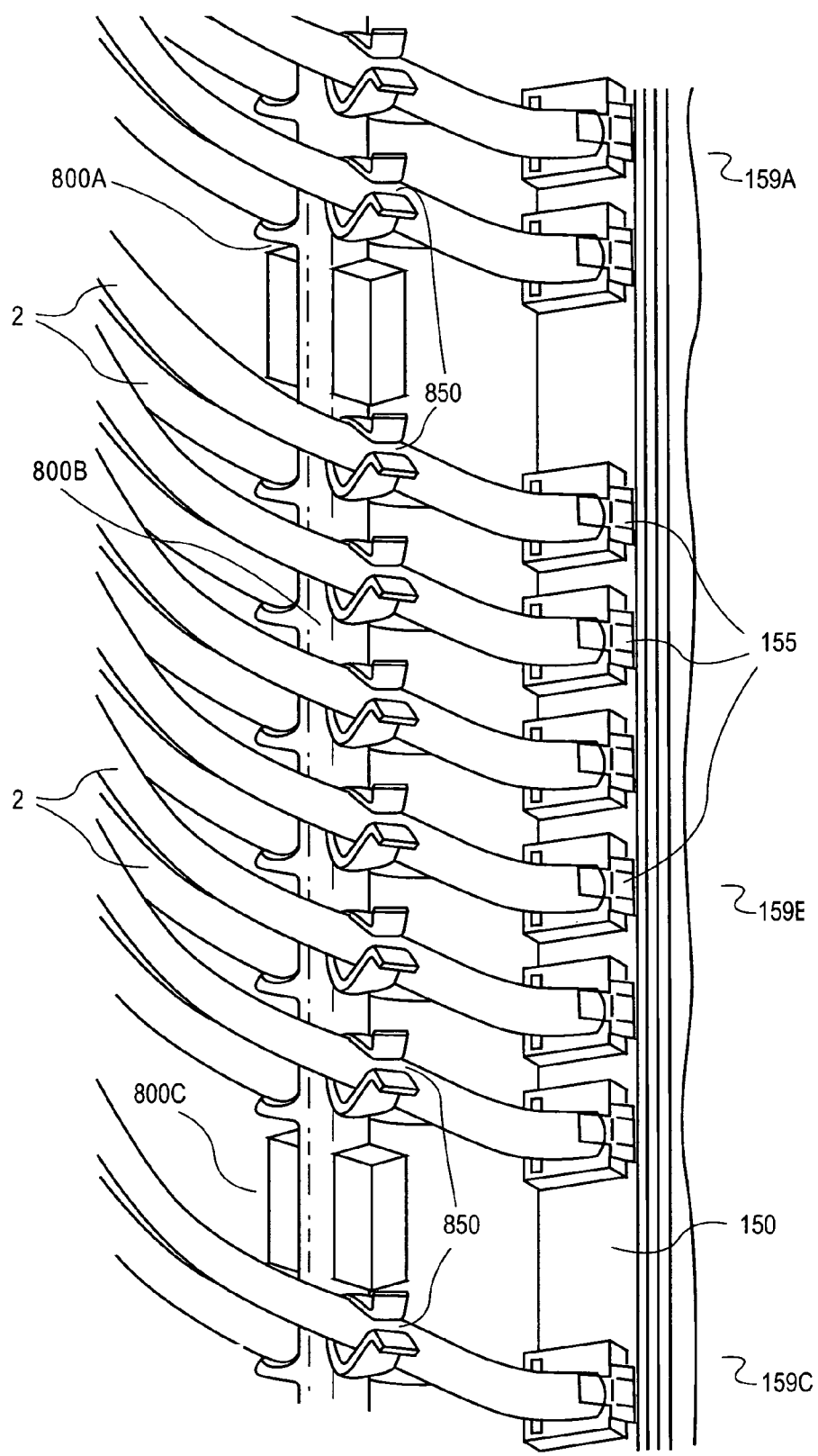
FIG. 10 is a perspective view illustrating an example of use of the cable clip shown in FIGS. 8A–8E.

An example of use of the cable clip 800 is illustrated in FIG. 10. Referring to this figure, a blade 150 includes a number of connectors 155. The connectors 155 are arranged together in groups of twelve connectors that are configured in 2×6 arrays 159a, 159b, 159c. Three cable clips 800a, 800b, 800c are interconnected together end-to-end, as described above. Each cable 2 that is plugged into a connector 155 is positioned in one of the clasps 850, wherein each of the clips 800a–c is capable of holding all cables associated with one of the 2×6 arrays 159a–c (e.g., clip 800b holds all cables originating from the 2×6 array of connectors 159b, as shown in FIG. 10). Although only three clips 800a–c are shown in FIG. 10, it should be understood that any suitable number of the clips 800 may be interconnected to match the number of connectors 155 (and/or the number of cables) associated with the blade 150.

Turning to FIGS. 11A through 11G, an embodiment of a bundle clip 1100 is illustrated. The bundle clip 1100 comprises a generally cylindrical-shaped body 1110 comprise of a resiliently flexible material. In one embodiment, the bundle clip 1100 is constructed from a plastic material; however, the clip may be formed from any other suitable resilient material. In another embodiment, the bundle clip 1100 is constructed using a molding process (e.g., injection molded plastic), and in a further embodiment, the clip 1100 is constructed as a single part (as may be achieved by, for example, an injection molding process).

As noted above, the bundle clip 1100 comprises a generally cylindrical shaped body 1110, and this body 1110 defines an interior region 1115. In one embodiment, this cylindrical shaped body 1110 may be substantially round, and in another embodiment, the cylindrical shaped body 1110 may have an oval shape, as shown in FIGS. 11A–H. During use, a number of cables will be disposed in the interior region 1115, and the bundle clip 1100 will hold these cables together in a bundle. The bundle clip 1100 can be adapted to receive any desired number of cables in the interior region 1115. In one embodiment, the interior region 1115 is sized and shaped to receive all cables that are held by one of the cable clips 800 described above. The bundle clip 1100 may hold any type of cable, whether electrical (e.g., copper wire) or optical (e.g., an optical fiber).

Figure 11A:
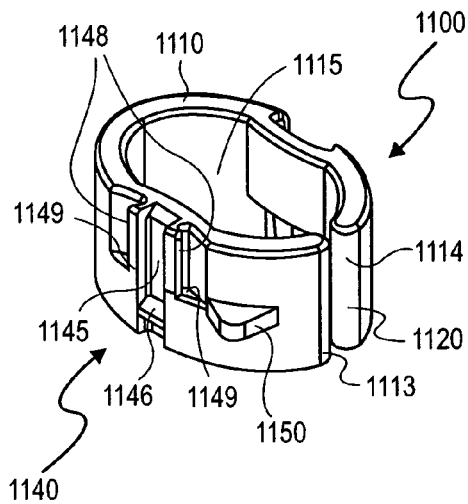
FIGS. 11A–B are perspective views of one embodiment of a bundle clip.
Figure 11B:
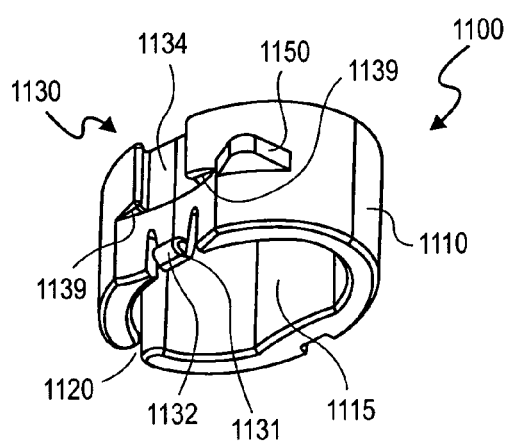
Figure 11H:
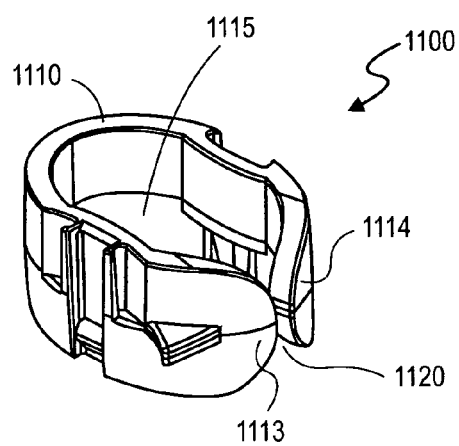
FIG. 11H is a perspective view of another embodiment of a bundle clip.

The clip body 1110 further defines an entry 1120, the entry comprising a slot that opens into the interior region 1115. To insert a cable 2 (see FIGS. 11C and 11E) within the interior region 1115, the cable is inserted through the entry 1120 and into the interior region 1115. To insure that cables placed in the interior region 1115 cannot escape from the bundle clip 1100, the entry 1120 has a width dimension that is less than a diameter of the cables 2 for which the bundle clip is intended to be used. Insertion of a cable 2 into the interior region 1115 is achieved by pushing the cable into the entry 1120 with a force sufficient to overcome the opposing force exerted by the resilient body 1110 as this body elastically deforms (e.g., as the body 1110 bends to allow separation of the entry 1120). Note that, as shown in FIGS. 11A, 11C, and 11E, the ends 1113, 1114 of the clip body 1110 proximate the entry 1120 are rounded to facilitate insertion of a cable 2 through the entry and into the interior region 1115. In yet another embodiment, as shown in FIG. 11H, the ends 1113, 1114 of the clip body 1110 may be curved (e.g., each of the ends 1113, 1114 is generally semicircular in shape) to facilitate insertion of cables 2 into the interior region 1115. Note that, in one embodiment, the bundle clip 1100 may be designed for use with cables of various diameters (e.g., a copper cable and a relatively smaller optical fiber cable). In this embodiment, the entry 1120 should be sized to prevent escape of the smaller diameter cable, whereas the interior region 1115 should be sized to receive a number of the larger diameter cables.

Disposed on the bundle clip's body 1110 is a first coupling mechanism 1130 and a second coupling mechanism 1140, wherein the coupling mechanism 1130, 1140 are disposed on opposing sides of the body 1110 (e.g., approximately 180 degrees apart, as measured about a center 1105 of the clip body). The first and second coupling mechanisms 1130, 1140 function to interconnect the bundle clip 100 with one or more other bundle clips. The first coupling mechanism 1130 comprises a resiliently flexible arm 1131 extending from the clip body 1110 and having a protrusion 1132 disposed at an end thereof. Disposed adjacent to the flexible arm 1131 is a keyway 1134 (which, in the illustrated embodiment, comprises a slot configured to mate with a corresponding key on another bundle clip, as will be described below). The second coupling mechanism 1140 comprises a channel 1145 (that is sized to slidably receive the protrusion 1132 of the first coupling mechanism 1130 on a second bundle clip). Second coupling mechanism 1140 also includes a retaining element 1146 disposed in the channel 1145, the retaining element 1146 comprising a wall of material extending outwards from a bottom surface of channel 1145 (that is configured to interface with the protrusion 1132 on the second bundle clip, in order to lock the two bundle clips together). The second coupling mechanism 1140 further comprises a key 1148 (which, in the illustrated embodiment, comprises a "dove-tail" like structure configured to mate with the keyway 1134 on the second bundle clip).

Figure 12A:
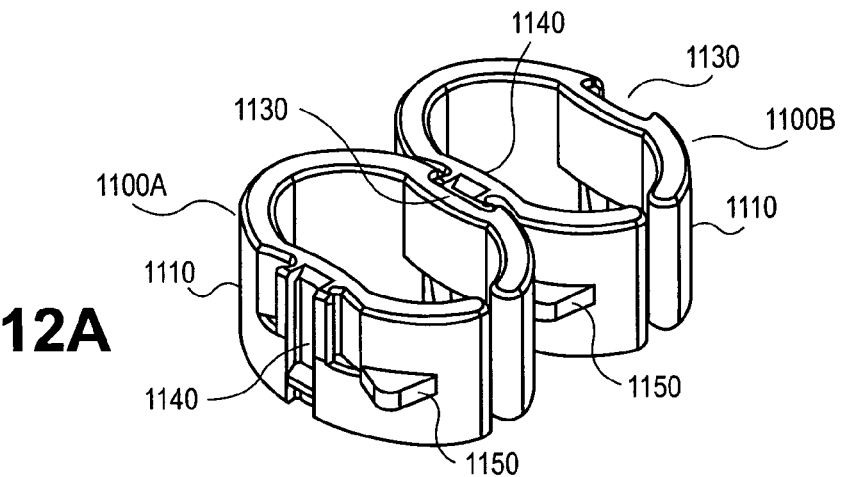
FIG. 12A is a perspective view illustrating interconnection of two of the bundle clips shown in FIGS. 10A–10G.
Figure 12B:
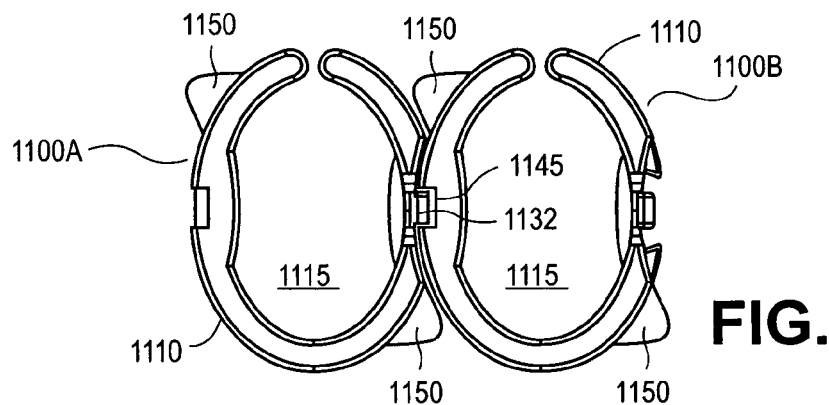
FIG. 12B is a plan view further illustrating interconnection of the two cable bundle shown in FIG. 11A.
Figure 12C:
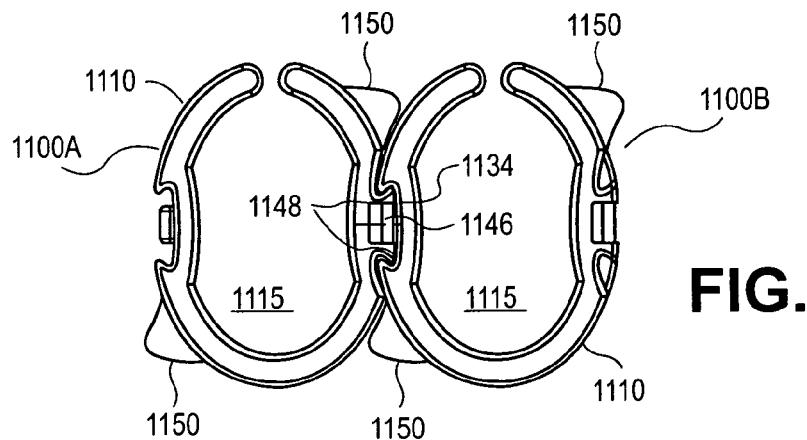
FIG. 12C is another plan view further illustrating interconnection of the two cable bundle shown in FIG. 11A.

Interconnection of two of the bundle clips 1100 is illustrated in FIGS. 12A through 12C. Referring to these figures, a first bundle clip 1100a is coupled with a second bundle clip 1100b. The first coupling mechanism 1130 of the first bundle clip 1100a is coupled with the second coupling mechanism 1140 of the second bundle clip 1100b. A perspective view of the interconnected bundle clips 1100a, 1100b is shown in FIG. 12A, whereas top and bottom elevation views are shown in FIGS. 12B and 12C, respectively. The protrusion 1132 (see FIG. 12B) of the first coupling mechanism 1130 on first bundle clip 1100a mates with the retaining element 1146 (see FIG. 12C) of the second coupling mechanism 1140 on second bundle clip 1100b. Further, as seen in FIG. 12C, the key 1148 of the second coupling mechanism 1140 on second clip 1100b engages keyway 1134 of the first coupling mechanism 1130 on first clip 1100a.

To interconnect the two bundle clips 1100a, 1100b, the protrusion 1132 of the first coupling mechanism 1130 (on first clip 1100a) is slid into the channel 1145 of the second coupling mechanism 1140 (on second clip 1100b), and the key 1148 of the second coupling mechanism 1140 is inserted into the keyway 1134 of the first coupling mechanism 1130. The coupling mechanisms 1130, 1140 of the two clips are slid together until a lower surface 1139 of the keyway 1134 (see FIG. 11B) abuts (or is at least in close proximity to) a bottom surface 1149 of the key 1148 (see FIG. 11A). When the key 1148 and keyway 1134 are fully engaged, the protrusion 1132 of the first coupling mechanism 1130 will have engaged the retaining element 1146 of the second coupling mechanism 1140. The protrusion 1132 is able to engage the retaining element 1146 because the flexible arm 1131 on which the protrusion 1132 is disposed will elastically deform (e.g., bend) as the protrusion slides over the retaining element 1146. The interaction between the protrusion 1132 and retaining element 1146, as well as the engagement between the key 1148 and keyway 1134, function together to secure the first and second bundle clips together. To separate the interconnected bundle clips 1100a, 1100b, the clips are slid apart with a force sufficient to overcome the forces resulting from elastic deformation of the flexible arm 1131 of the first coupling mechanism as the protrusion 1132 on that arm slides back over the retaining element 1146 and recedes from the channel 1145 of second coupling mechanism 1140.

Any suitable number of the bundle clips may be secured together in a manner similar to that described above. For example, with reference to FIG. 12A, a third bundle clip 1100 may secured to the first bundle clip 1100a, wherein the first coupling mechanism 1130 on the third bundle clip is coupled with the second coupling mechanism 1140 on first bundle clip 1100a. Similarly, in addition to (or in lieu of) the third bundle clip, a fourth bundle clip 1100 may be secured to the second bundle clip 1100b, with the first coupling mechanism 1130 on the second bundle clip 1100b coupled with the second coupling mechanism 1140 of the fourth bundle clip. It should be understood that the coupling mechanisms 1130,1140 illustrated in FIGS. 11A–11G and FIGS. 12A–12C are but one example of the manner in which the bundle clips 1100 can be interconnected. Those of ordinary skill in the art will appreciate that any other suitable scheme or device may be employed to interconnect two or more of the bundle clips 1100.

With continued reference to FIGS. 11A through 12C, in one embodiment, the bundle clip 1100 includes two opposing support elements 1150, which extend outwards from the clip body 1110. The support elements 1150 are spaced apart on the body 1110 by 180 degrees, as measured about the center 1105. When the two bundle clips 1100a, 1100b are interconnected (see FIGS. 12A–12C), one of the support elements 1150 on the first clip will abut (or at least lie in close proximity to) an outer surface of the second clip's body and, likewise, one of the support elements 1150 on the second clip will abut (or at least lie in close proximity to) an outer surface of the first clip's body. Thus, the support elements 1150 function to stabilize the interconnection between the two attached bundle clips 1100a, 1100b and prevent bending or twisting of the clips 1100a, 1100b (e.g., bending about the joint formed between their linked coupling mechanism 1130, 1140).

Figure 13:
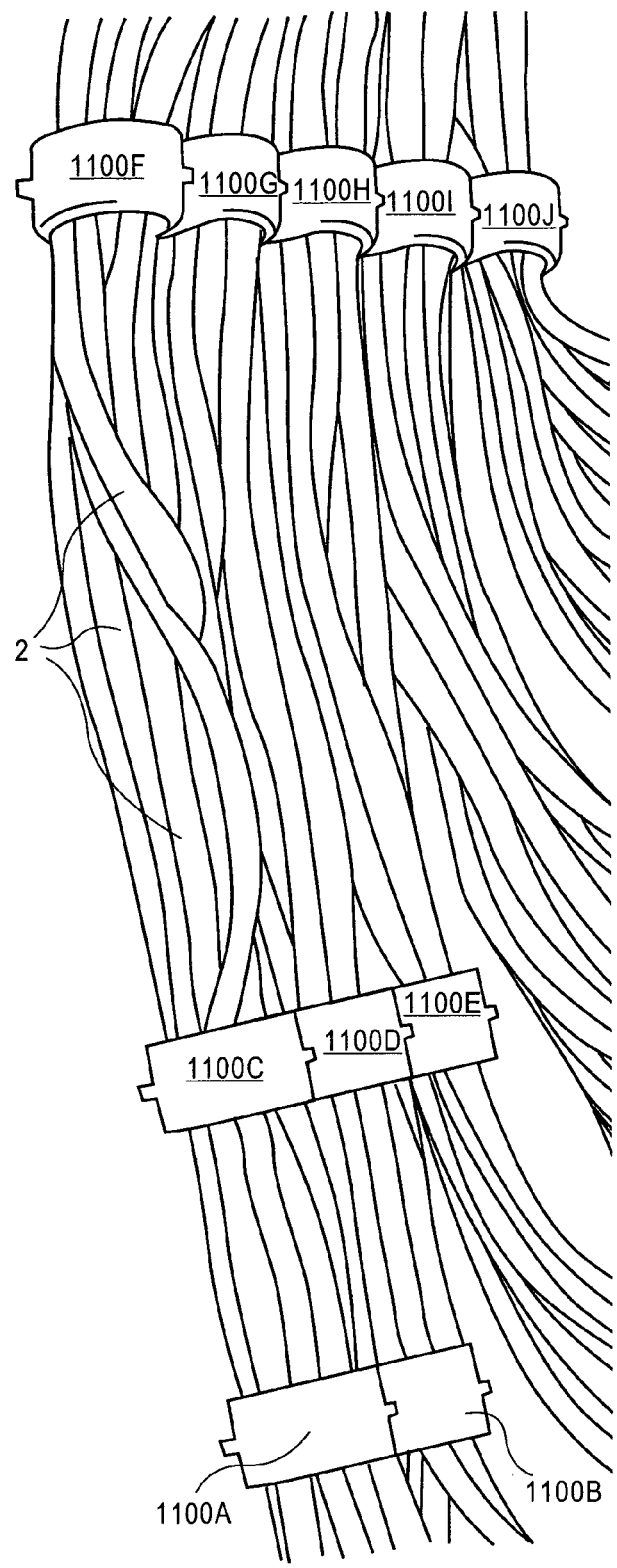
FIG. 13 is a perspective view illustrating an example of use of the bundle clip shown in FIGS. 10A–10G.

An example of use of the bundle clip 1100 is illustrated in FIG. 13. Referring to this figure, a first set of bundle clips 1100a, 1100b are interconnected, each of the bundle clips 1100a, 1100b holding a group of cables 2 within their respective interior regions 1115. A second set of bundle clips 110c, 1110d, 1110e are also interconnected, and each of these bundle clips holds a group of cables 2. Note that the bundle clip 1100a of the first set and the bundle clip 1100c of the second set are each holding the same group of cables 2. Similarly, the bundle clips 1100b, 1100d of the first and second sets, respectively, are each holding the same group of cables. A third interconnected set of bundle clips includes clips 1100f, 1100g, 1100h, 1100i, and 1100j, each of these clips holding a group of cables 2. Again, some of the bundle clips in the third set hold the same group of cables as a bundle clip of the second set (and the same group of cables as a bundle clip of the first set). For example, the bundle clips 1100a, 1100c, and 1100f all hold the same group of cables 2.

Figure 14:
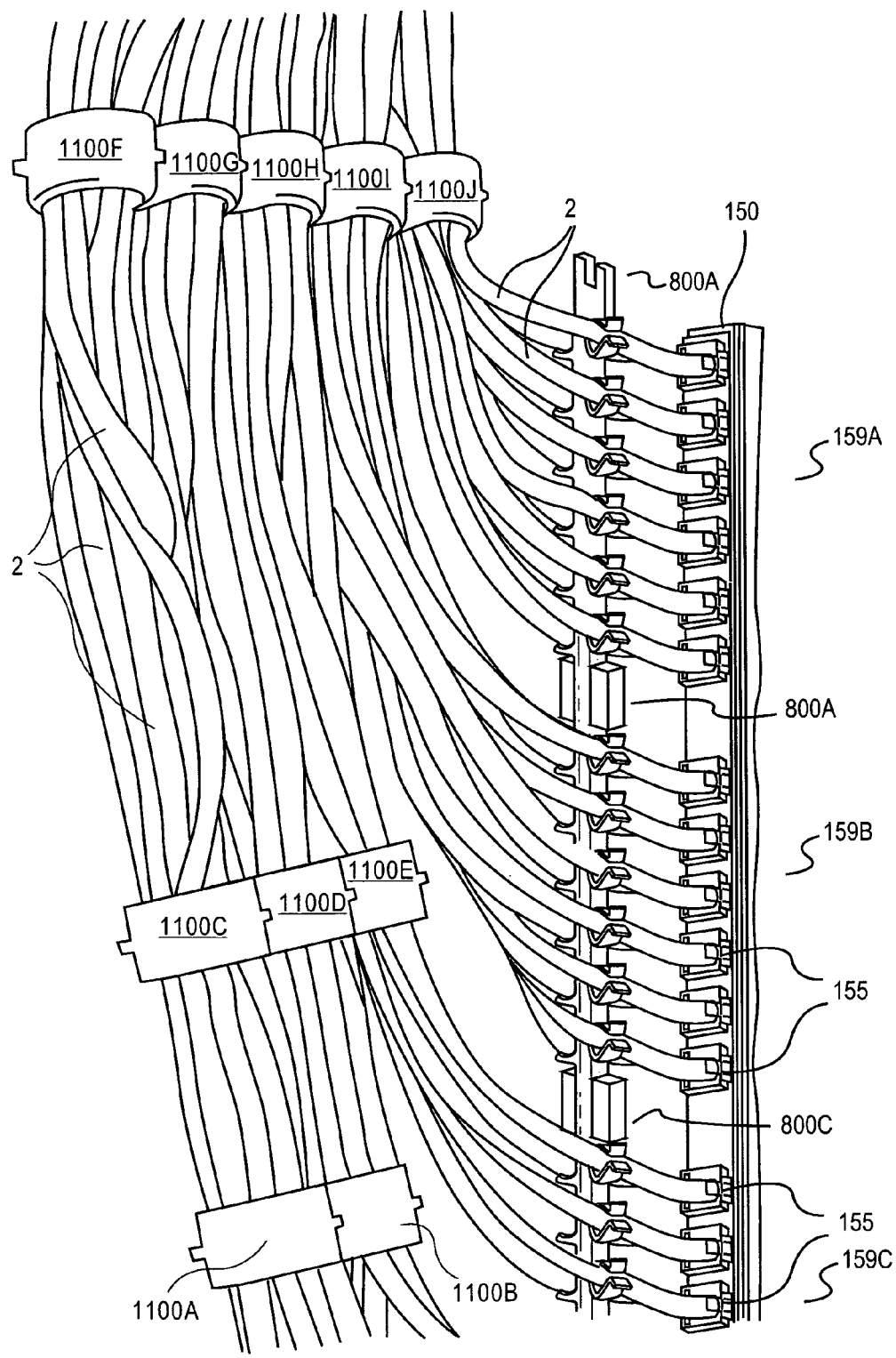
FIG. 14 is a perspective view illustrating an example of use of the cable clip of FIGS. 8A–8E in conjunction with the bundle clip of FIGS. 10A–10G.

In one embodiment, one or more of the bundle clips 1100 are used in combination with one or more of the cable clips 800 to perform cable management. An exemplary embodiment of the use of a number of bundle clips 1100 in combination with a number of cable clips 800 is shown in FIG. 14. Referring to this figure, a blade 150 includes a number of connectors 155. The connectors 155 are arranged together in groups of twelve connectors that are configured in 2×6 arrays 159a, 159b, 159c. Three cable clips 800a, 800b, 800c are interconnected together end-to-end, and each of the clips 800a–c is holding all cables 2 associated with one of the 2×6 arrays 159a–c (e.g., clip 800a holds all cables originating from the 2×6 array of connectors 159a, and so on). A number of bundle clips 1100a through 1100j are also used to manage the cables 2. The bundle clips 1100a, 1100b are connected together, the bundle clips 1100c, 1100d, 1100e are connected together, and the bundle clips 1100f through 1100j are connected together. Each of the bundle clips 1100a–j is holding a group of the cables 2. In the embodiment of FIG. 14, each of the bundle clips 1100a–j holds all of the cables associated with one of the cable clips 800a–c (and one of the 2×6 arrays of connectors 159a–c). For example, the cables 2 held by cable clip 800a are also held by bundle clip 1100j. Similarly, the cables 2 held by cable clip 800b are held by bundle clip 1100i, and the cables 2 held by cable clip 800c are held by bundle clips 1100e and 1100h (the other bundle clips holding cables originating from other connectors on the blade 150 and held by other cable clips not shown in FIG. 14). Any suitable number of cable clips 800 and bundle clips 1100 may be used in combination, as required by the application at hand.

In yet another embodiment, a number of the cable clips 800 and a number of the bundle clips 1100 are used in combination with the cable harness 300 to perform cable management. For example, returning to FIG. 14, all of the cables originating from the blade 150 (and held by the cable clips 800a–c and bundle clips 1100a–j) may be directed to one of the channels 430 on frame 400 or one of the channels 530 on a channel array 500, and this channel (430 or 530) will then route the cables out to one of the raceways 51, 52, 53 (see FIG. 2). In another embodiment, rather than routing all cables from one blade through a single channel (430 or 530) of the cable harness 300, the cables from a single blade are routed through two or more different channels of the cable harness.

Figure 15:
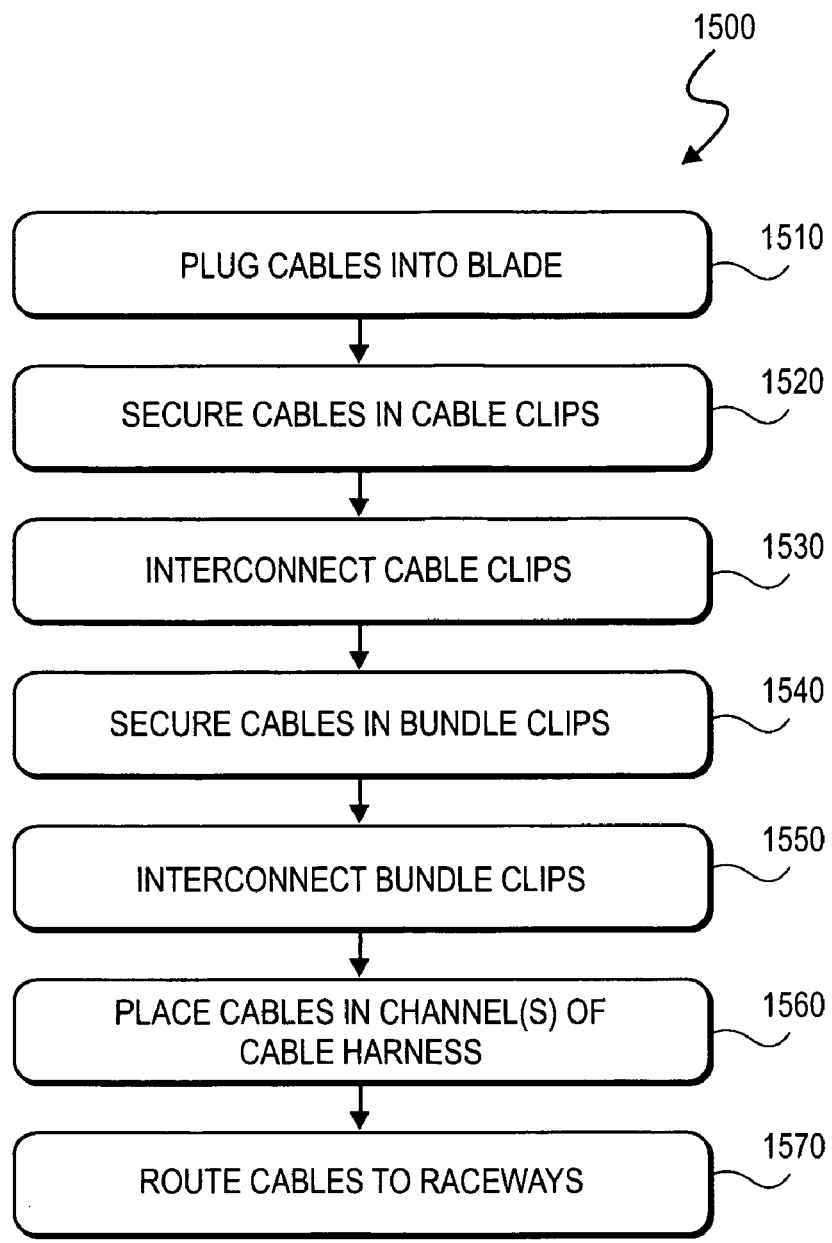
FIG. 15 is a block diagram illustrating one embodiment of a method for managing cables of a rack mounted installation.

Illustrated in FIG. 15 is an embodiment of a method 1500 of managing cables in a rack mounted installation using the cable harness 300 in combination with a number of cable clips 800 and a number of bundle clips 1100. Referring to block 1510, a number of cables are plugged into a blade that is disposed in a rack, the rack having a cable harness 300 that has been secured thereto. The cables are then secured in one or more cable clips 800, as set forth at block 1520, and these clips are interconnected, which is set forth in block 1530. Referring to block 1540, the cables are secured in one or more bundle clips 1100, and the bundle clips are then interconnected, as set forth in block 1550. The cables are then placed in one of the channels (or in multiple channels) of the cable harness 300—e.g., either a channel 430 of the frame 400 or a channel 530 of a channel array 500—which is set forth in block 1560. Referring to block 1570, the cable harness will then route the cables into a raceway adjacent to the rack. The above described procedure may then be repeated for each blade in the rack.

Embodiments of a cable harness 300, cable clip 800, and bundle clip 1100, as well as a method 1500 for cable management, having been described above, those of ordinary skill in the art will appreciate the advantages of the disclosed embodiments. The cable harness 300 provides for routing of cables in multiple directions, including towards either of opposing sides of a rack, as well as vertically upwards. Use of one or more of the cable clips 800 and, perhaps, one or more of the bundle clips 1100—as well as the dedication of a particular channel of the cable harness to a single blade—can preserve the spatial relationships between a number of cables and their respective connectors on a blade when that blade is removed from the rack. Also, when a set of cable clips 800 and/or a set of bundle clips 1100 are used to maintain these spatial relationships for the cables of a particular blade, those cables associated with that particular blade can be readily identified should removal of that blade from the rack be necessary. Further, the disclosed cable harness 300, cable clip 800, and bundle clip 1100 can be used in combination as a cable management system.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A cable harness comprising:
   a frame capable of being attached to a rack, the rack having a number of blades disposed therein, the frame including a number of channels, each channel for routing at least one cable from one of the blades and toward a rear of the rack; and
   a channel array capable of being coupled with the frame, the channel array including a number of channels, each channel for routing at least one cable from one of the blades and towards one side of the rack wherein each channel is defined by a generally semicircular channel floor and two opposing channel sidewalls extending from the channel floor, each of the channels of the channel array extends along an approximate ninety degree arc.

2. The cable harness of claim 1, further comprising:
a second channel array capable of being coupled with the frame, the second channel array including a number of channels, each channel for routing at least one cable from one of the blades and towards an opposing side of the rack.

3. The cable harness of claim 2, wherein the frame defines a first bay for receiving the channel array and a second bay for receiving the second channel array.

4. The cable harness of claim 3, wherein each of the first and second bays includes at least one guide element, the at least one guide element of each bay to position a channel array in that bay.

5. The cable harness of claim 3, wherein each of the channel array and the second channel array is coupled with the frame using at least one fastener.

6. The cable harness of claim 3, wherein each of the channel array and the second channel array is coupled with the frame by a snap fit.

7. The cable harness of claim 1, wherein each of the channels of the frame routes the at least one cable into an open cavity of the rack and toward the rear of the rack.

8. The cable harness of claim 7, wherein, at the rear of the rack, the at least one cable associated with each of the channels is routed upwards towards a top of the rack.

9. The cable harness of claim 1, wherein each channel of the channel array includes a hook for receiving an anchoring device, the anchoring device for holding a number of cables.

10. The cable harness of claim 1, wherein each channel of the channel array includes a pair of opposing slots for receiving an anchoring device, the anchoring device for holding a number of cables.

11. The cable harness of claim 1, further comprising a cover capable of being attached to the frame, the cover overlying the channel array.

12. The cable harness of claim 1, wherein each channel of the frame comprises a generally rectangular-shaped open channel having a floor and two opposing sidewalls extending upwards from the floor.

13. The cable harness of claim 1, wherein each channel of the channel array comprises a generally rectangular-shaped open channel.

14. The cable harness of claim 13, wherein the floor is generally semicircular in shape.

15. The cable harness of claim 1, wherein each of the frame and the channel array comprises a plastic material.

16. The cable harness of claim 15, wherein each of the frame and the channel array is constructed using a molding process.

* * * * *